United States Patent
Walch et al.

(10) Patent No.: US 9,684,815 B2
(45) Date of Patent: Jun. 20, 2017

(54) MOBILITY EMPOWERED BIOMETRIC APPLIANCE A TOOL FOR REAL-TIME VERIFICATION OF IDENTITY THROUGH FINGERPRINTS

(71) Applicant: SCIOMETRICS LLC, Herndon, VA (US)

(72) Inventors: Mark A. Walch, Fairfax Station, VA (US); Daniel Gantz, Arlington, VA (US); James Leopore, Alexandria, VA (US)

(73) Assignee: SCIOMETRICS LLC, Herndon, VA (US)

( * ) Notice: Subject to any disclaimer, the term of this patent is extended or adjusted under 35 U.S.C. 154(b) by 0 days.

(21) Appl. No.: 14/859,151

(22) Filed: Sep. 18, 2015

(65) Prior Publication Data
US 2016/0210493 A1  Jul. 21, 2016

Related U.S. Application Data

(60) Provisional application No. 62/052,377, filed on Sep. 18, 2014.

(51) Int. Cl.
*G06K 9/00* (2006.01)
*G06K 9/22* (2006.01)

(52) U.S. Cl.
CPC ........... *G06K 9/001* (2013.01); *G06K 9/0008* (2013.01); *G06K 9/00013* (2013.01); *G06K 9/228* (2013.01)

(58) Field of Classification Search
CPC .. G06K 9/001; G06K 9/0008; G06K 9/00013; G06K 9/228; G06F 2203/0338

(Continued)

(56) References Cited

U.S. PATENT DOCUMENTS 9,342,728 B2 * 5/2016 Abramovich ...... G06K 9/00033
2002/0018585 A1   2/2002 Kim
(Continued)

FOREIGN PATENT DOCUMENTS

EP        2388734 A1    11/2011

OTHER PUBLICATIONS

Rao, et al. "Adaptive Fingerprint Enhancement", IJFGCN, pp. 159-170, Aug. 2014.*

(Continued)

*Primary Examiner* — Daniel Mariam
(74) *Attorney, Agent, or Firm* — Procopio, Cory, Hargreaves & Savitch, LLP; Noel C. Gillespie

(57) ABSTRACT

A system for transforming an image of a fingerprint, comprises a mobile device, comprising: a first communication interface, a camera configured to capture at least one image of at least one fingerprint, and a mobile device processor configured to execute instructions, the instructions configured to cause the mobile device processor to receive the image from the camera and transmit them to an image processing system via the first communication interface; and an image processing system, comprising: a second communication interface configured to receive the image, and an image processor configured to execute instructions, the instructions configured to cause the image processor receive the image form the second communication interface, and: render the image into a high contrast image, establish focus and image resolution for the image, perform noise reduction on the image, and perform distortion elimination on the image.

7 Claims, 23 Drawing Sheets

(58) Field of Classification Search
USPC .................................. 382/115, 124–127, 313
See application file for complete search history.

(56) References Cited

U.S. PATENT DOCUMENTS

| | | | |
|---|---|---|---|
| 2002/0146178 A1* | 10/2002 | Bolle | G06K 9/00067 |
| | | | 382/254 |
| 2005/0169505 A1 | 8/2005 | Xia et al. | |
| 2010/0149100 A1* | 6/2010 | Meiby | G06F 1/1626 |
| | | | 345/168 |
| 2012/0194784 A1 | 8/2012 | Shih | |
| 2013/0101186 A1* | 4/2013 | Walch | G06K 9/00093 |
| | | | 382/125 |
| 2014/0044323 A1 | 2/2014 | Abramovich et al. | |

OTHER PUBLICATIONS

International Search Report and Written Opinion mailed on Jan. 11, 2016, in corresponding International Application No. PCT/US2015/051080, 9 pages.

* cited by examiner

| Feature | Graphic |
|---|---|
| 1502 — Locate hands in smartphone photograph. | |
| 1504 — Isolate fingerprints. | |
| 1506 — Extract friction ridges. | |
| 1508 — Generate high contrast image. | |
| 1510 — Identify reference points for burst views of images. | |
| 1512 — Weave compound image from different views. | |

FIG. 15

| | Smartphone Device | Processor | AFIS | Post Processor |
|---|---|---|---|---|
| | 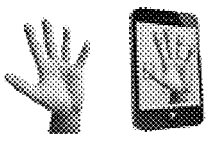 | 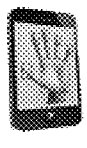 | 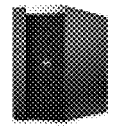 | 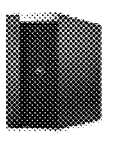 |
| Option 1 | Smartphone resident application to guide hand photography in terms of capture (burst), focus, quality, image position and quality validation. Image is transmitted to web or cloud based query generator. | Web or cloud based query generator receives raw image from Smartphone, generates high contrast fingerprint image, extracts minutiae and submits AFIS Query. | AFIS receives Query, matches against database and returns results. | Web or cloud based service receives results, disambiguates (if necessary), sends results to device for presentation. |
| Option 2 | Smartphone resident application to guide hand photography in terms of capture (burst), focus, quality and image position. Device-based query generator receives raw image, generates high contrast fingerprint image, extracts minutiae and submits AFIS Query. | | AFIS receives Query, matches against database and returns results. | Device based service receives results, disambiguates (if necessary), sends results to device for presentation. |

FIG. 18

MOBILITY EMPOWERED BIOMETRIC APPLIANCE A TOOL FOR REAL-TIME VERIFICATION OF IDENTITY THROUGH FINGERPRINTS

BACKGROUND

1. Field

The present invention is directed generally to biometric recognition, and more particularly to identifying persons using fingerprints captured through smartphones and other mobile appliances.

2. Background

Fingerprints are truly the "human barcode" and among the best measures of human identity available. Fingerprints are similar to DNA as biometric identifiers because they can be obtained either (1) directly from individuals or (2) from things individuals have touched in places they have been. An additional advantage of fingerprints is they are readily matched to each other through well proven techniques; however, "traditional" fingerprints represent only a portion of what the hand offers in terms of identity. Other data available take the form of "palmprints," which comprise a class that includes not only the palm but also includes the second and third joints of the fingers, and the finger sides and tips and the sides of the hand ("writer's palm").

There are many portable, or embedded fingerprint scanners. Because the focus of such conventional fingerprint capture technology is on fingers however, the palm class of prints is often ignored. In fact, most portable scanners have no palm scanning capability because such a scanner would require a large platen (window) to scan a full palm.

SUMMARY

Systems and methods for using a portable device such as a smartphone for real-time biometric identification are described herein.

According to one aspect, A system for transforming an image of a fingerprint, comprises a mobile device, comprising: a first communication interface, a camera configured to capture at least one image of at least one fingerprint, and a mobile device processor configured to execute instructions, the instructions configured to cause the mobile device processor to receive the image from the camera and transmit them to an image processing system via the first communication interface; and an image processing system, comprising: a second communication interface configured to receive the image, and an image processor configured to execute instructions, the instructions configured to cause the image processor receive the image form the second communication interface, and: render the image into a high contrast image, establish focus and image resolution for the image, perform noise reduction on the image, and perform distortion elimination on the image.

BRIEF DESCRIPTION OF THE FIGURES

The above and other aspects and features of the present inventive concept will be more apparent by describing example embodiments with reference to the accompanying drawings, in which:

FIG. 15 illustrates an example process for converting, e.g., a smartphone image to a viable fingerprint according to one embodiment;

FIG. 18 shows a schematic of two potential operational scenarios for performing AFIS queries using, e.g., smartphone devices in accordance with one embodiment;

DETAILED DESCRIPTION

Figure 1:
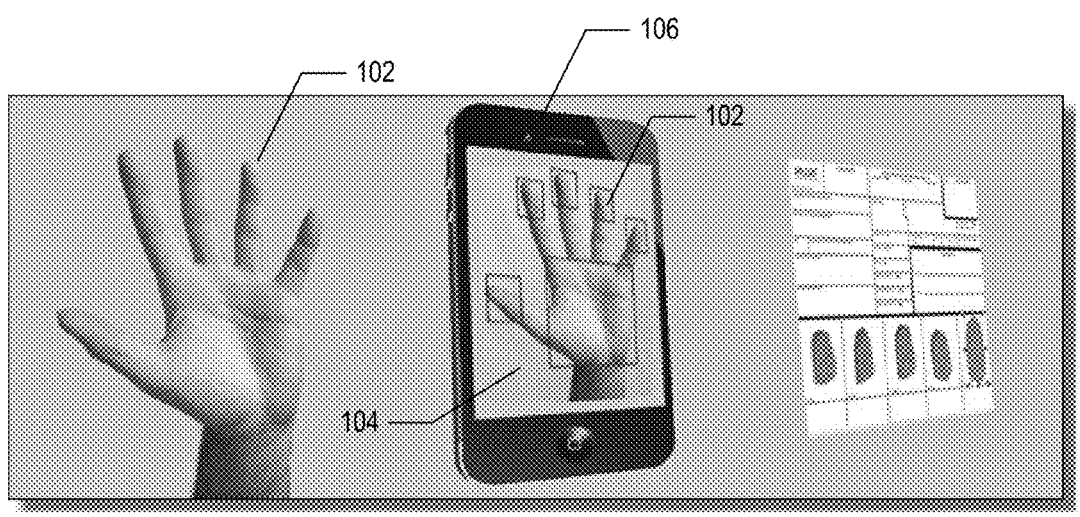
FIG. 1 illustrates a smartphone-based fingerprint capture process according to one example embodiment.

The embodiments described herein provide end-to-end capability through a smartphone (1) to capture images of fingers, palms and other parts of the hand; (2) to render these into a high contrast image showing the bifurcations and terminations of the underlying ridge structure; (3) to identify minutiae at these critical junctures in the ridge flow; (4) to assemble the minutiae information as an "AFIS Query," i.e., a formatted packet of information that can be directly submitted to an AFIS; (5) to receive results from the AFIS; (6) to disambiguate these results, if necessary; and (7) to display information regarding matching reference prints on the mobile device.

Such an end-to-end smartphone fingerprint capture device should meet two basic technical requirements: (1) capturing an accurate depiction of the fingerprint ridges and (2) rendering these images with geometric accuracy matching that obtained by a contact scanner. The embodiments described herein present a solution that operates on a conventional smartphone with no custom modifications that will fulfill these requirements.

Conventional fingerprint capture technology works typically through capacitance or optical scanners—both requiring physical contact between the finger and the scanner. This invention broadens the role for fingerprints as a premier measure of identity in three ways: (1) to expand the opportunity for fingerprint capture by enabling commodity devices such as conventional smartphones with cameras to become fingerprint sensors with no specialized hardware, (2) to create a fingerprint capture capability that avoids physical contact between individuals—particularly under hostile conditions or cases where skin is fragile and would be damaged by contact, and (3) to expand the types of "prints" that can be used for identification to include palms and other areas of the hand. This product will address multiple unmet needs.

Smartphones are ubiquitous devices with very powerful sensor capabilities. When used to photograph fingers and hands, the smartphone camera has the ability to generate images of sufficient quality permitting extraction of features determining biometric identity. Smartphone cameras also do not have the limitation of a platen and have sufficient image resolution to capture images from the fingers as well as the palms.

The embodiments described herein vector the contactless image capture capabilities of the smartphone into a robust mobile solution that provides the means of directly capturing finger and palm images and submitting these images for matching in an Automated Fingerprint Identification System ("AFIS"). AFIS technology receives feature information from fingerprints in the form of "minutiae"—the bifurcations and terminations in the ridges of the finger—that are used to index reference prints in a database. After receiving the minutiae information, e.g., in the form of a search query, the AFIS can return a list of responsive reference prints from a database of known prints.

FIG. 1 illustrates a smartphone-based fingerprint capture process according to one example embodiment. As can be seen, an individual can place their hand 102 onto the screen 104 of a smartphone 106. Software running on smartphone 106 can then process the finger prints, palm prints or both. On the right are conventional images captured via a scanner. The figure illustrates the image captured through the smartphone 106 should be comparable in its structure and usage to a fingerprint captured through a scanner.

It should be noted that in certain embodiments, the user can simply hover their hand over screen 104. Further, the image capture mechanism can be a photo or series of photos. Alternatively, the software can configure the phone 106 such that a video capture of the relevant prints is captured as the user places their hand on the screen 104 or brings into range of the video camera. The software can then cause a video capture to begin. The software can further analyze the video images until an image of sufficient quality and resolution is captured, which can cause the capture to end. Instructions for the user can be presented audibly, on the screen 104 or both, directing the placement of the user's hand until such a sufficient image is obtained.

Figure 2:
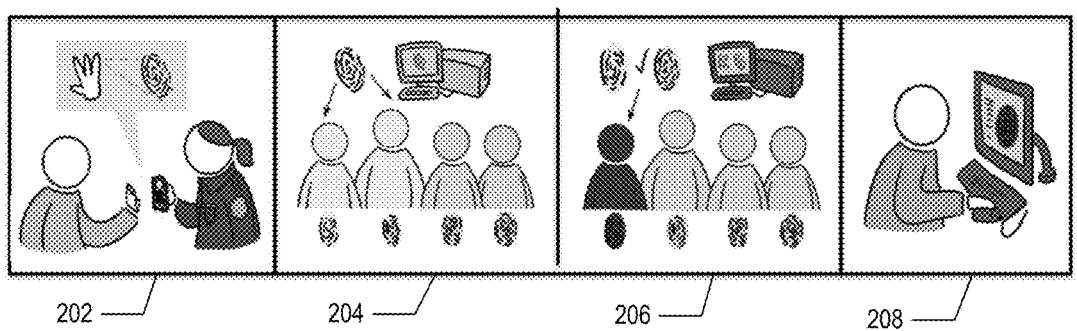
FIG. 2 illustrates an example use of the system and methods described herein.

FIG. 2 illustrates an example use of the system and methods described herein. First, in frame 202, a fingerprint is captured using a COTS (Commercial off-the-shelf) smartphone with onboard software, configured in accordance with the systems and methods described herein, to assist image acquisition and rendering of the hand into useable fingerprints. The subject's fingerprint may have also been, e.g., scanned using conventional techniques and therefore may exists within an AFIS. The output from the smartphone as well as the scanning process should be in an EBTS, EFTS, or similarly formatted file. The output of the capture shown in frame 202 can then be transmitted to the AFIS as part of a "search request," which can be sent from the mobile device. Metadata can also be captured at this time either by typing in the data or photographing identity cards or similar documents.

As illustrated in frame 204, the AFIS can return a candidate list of subjects responsive to the query. Given potential quality issues with the query images not all may hit the correct reference; however, if any individual query image hits the reference, a full set of "tenprints" will be returned creating an "Afterburner" opportunity. This is illustrated in frame 206. Thus, the systems and methods described herein provide an "AFIS Afterburner" capability to match all the fingers captured by the device, e.g., device 106 in FIG. 1, with the full set of tenprints returned by an AFIS.

As illustrated in frame 208, the AFIS (and Afterburner) results are available for review by an examiner, if the actual implementation requires human review.

Figure 3:
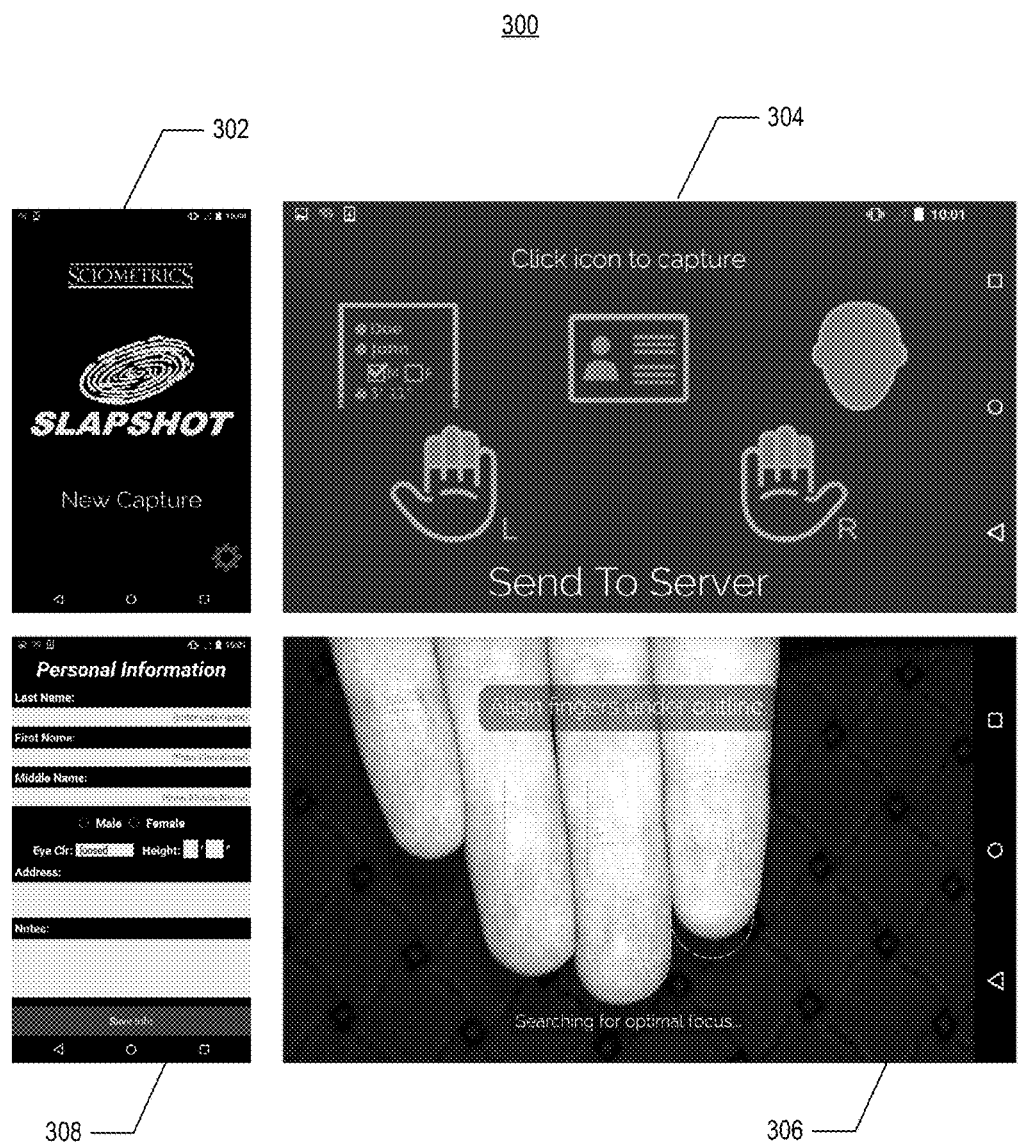
FIG. 3 illustrates a sample series of screens presented to the user that can comprise a user interface for use with the systems and methods described herein in accordance with one embodiment.

A critical aspect of the software running on the mobile device, e.g., smartphone 106, is the user experience. FIG. 3 illustrates a sample series of screens presented to the user that can comprise a user interface 300 called "Slapshot". Clockwise from the upper left corner, the images are described as follows. Screen 302 shows the basic opening screen of the Slapshot application. From this screen 302, the user moves, e.g., by selecting "New Capture," to Screen 304, which provides a single source of all functionality. In this example, the options from Screen 304 include: biographic information, automatic identity document capture, face capture, a left slap (4 fingers) and a right slap (4 fingers). In certain embodiments, two thumbs in a single image plus other functionality desired by a specific user can also be made available.

Once a selection is made, e.g., "right slap," then the user transitions to Screen 306 where they are prompted, requested, directed, etc., to place their hand on/over the screen. In this example of FIG. 3, it can be seen that a target viewer with finger "outlines" to assist positioning fingers is presented to the user. As the fingers are positioned, the application can automatically determine focus, as described above, and capture an image when the focus has been optimized.

Screen 308 shows sample metadata that can be captured along with the biometric information. This information is configurable and can also be captured from barcodes or other mechanisms contained in certain identity documents such as drivers' licenses.

Figure 4:
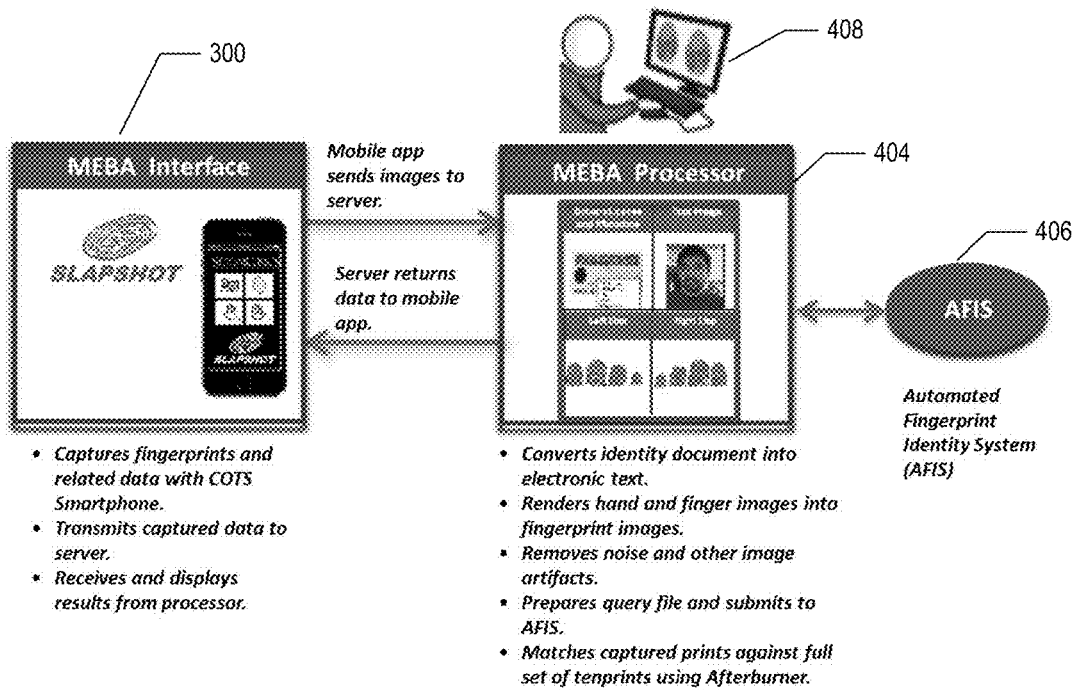
FIG. 4 illustrates the interaction between the mobile device configured in accordance with FIGS. 1-3 and an AFIS where fingerprint matching occurs in accordance with one example embodiment.

FIG. 4 illustrates the interaction between the mobile device configured as described above and an AFIS 406 where the fingerprint matching occurs. On the left, the user interface 300 running on an associated mobile device is shown. As noted above, the mobile device can be configured, with the aid of user interface 300, to capture biometric image data such as finger and palm prints. The image data is then transmitted to the AFIS 406 for analysis. The image data can be sent as raw or processed image data, or as part of an identity document that includes the image data as well as meta and possibly other data.

A user interface 404 is illustrated on the right. User interface 404 can be the user interface for an application that interfaces with the AFIS 406. Such an application can if necessary create an identity document, convert an identity document into electronic text, render hand and finger images into fingerprints, remove noise and other artifacts form the fingerprints, prepare and submit a query file to the AFIS 406. Once the AFIS runs the query and returns results, the application can help match the fingerprints against a full set of tenprints as described above and return the results to the mobile device application.

It will be understood that the AFIS 406 comprises the servers, processors, software, applications, user interfaces, data storage devices, etc., needed to perform the functions of an AFIS. Further, user interface 404 and the associated application can be accessed via a terminal 408 that is part of the AFIS 406 or simply interfaced with the AFIS 406. The application can then reside on the AFIS 406 or separate, e.g., on terminal 408. Terminal 408 can be located with the AFIS 406 or remote therefrom.

The process of transforming an image or a photograph into a fingerprint image suitable for AFIS submission involves several steps including rendering the photograph into a high contrast image, establishing focus and image resolution, noise reduction and distortion elimination. Additionally, after the results have been returned from the AFIS 406, post-processing can improve recognition results. These steps are discussed through the ensuing paragraphs.

First, with respect to image rendering it is important to note that contact scanners capture fingerprint ridges by separating skin in contact with the scanner (ridges) from skin not making physical contact (furrows). When images of fingers are captured photographically, there is no physical contact that can be used to separate ridges from furrows. So, this distinction must be made using only information available in the image, which consists of the color and luminance values of pixels.

Because of the high resolution afforded by, e.g., modern smartphone cameras, the image quality is quite good enabling the visual resolution of ridges and furrows and the detection of "Level 3" features such as pores in ridges as well as the contour of the ridges.

Various techniques are employed to transform a photograph of a finger into a high contrast image suitable for searching in an AFIS. These methods are discussed in the ensuring paragraphs.

The first step in the rendering process is the enhancement of the photographic images to improve contrast between ridges and furrows. The techniques employed to improve contrast uses specular reflection of light from a finger surface, which varies depending on the local angle of the skin relative to the light source and camera. Contrast enhancement using adaptive histogram equalization allows for clear separation between ridges and valleys, and permits accurate fusion of multiple images taken from different angles. Once a dense map of correspondences is created between two or more images, an accurate depth map can be created, and used to create a 2d projection of the 3d finger surface: this is a rolled-equivalent fingerprint image.

Once the images have been enhanced, they can be rendered into high contrast images resembling "traditional" fingerprints obtained by optical or contact scanning. The method for rendering ridges is discussed in FIG. 5 and presented in U.S. Patent Publication No. 2013/0101186, entitled "Systems and Methods for Ridge-Based Fingerprint Analysis," which is incorporated herein by reference as if set forth in full. A modification to this method can be made to address the issue of variation in ridge separation often encountered in fingers. This modification involves applying this technique multiple times and compositing the results to create the best image rendering.

Figure 5:
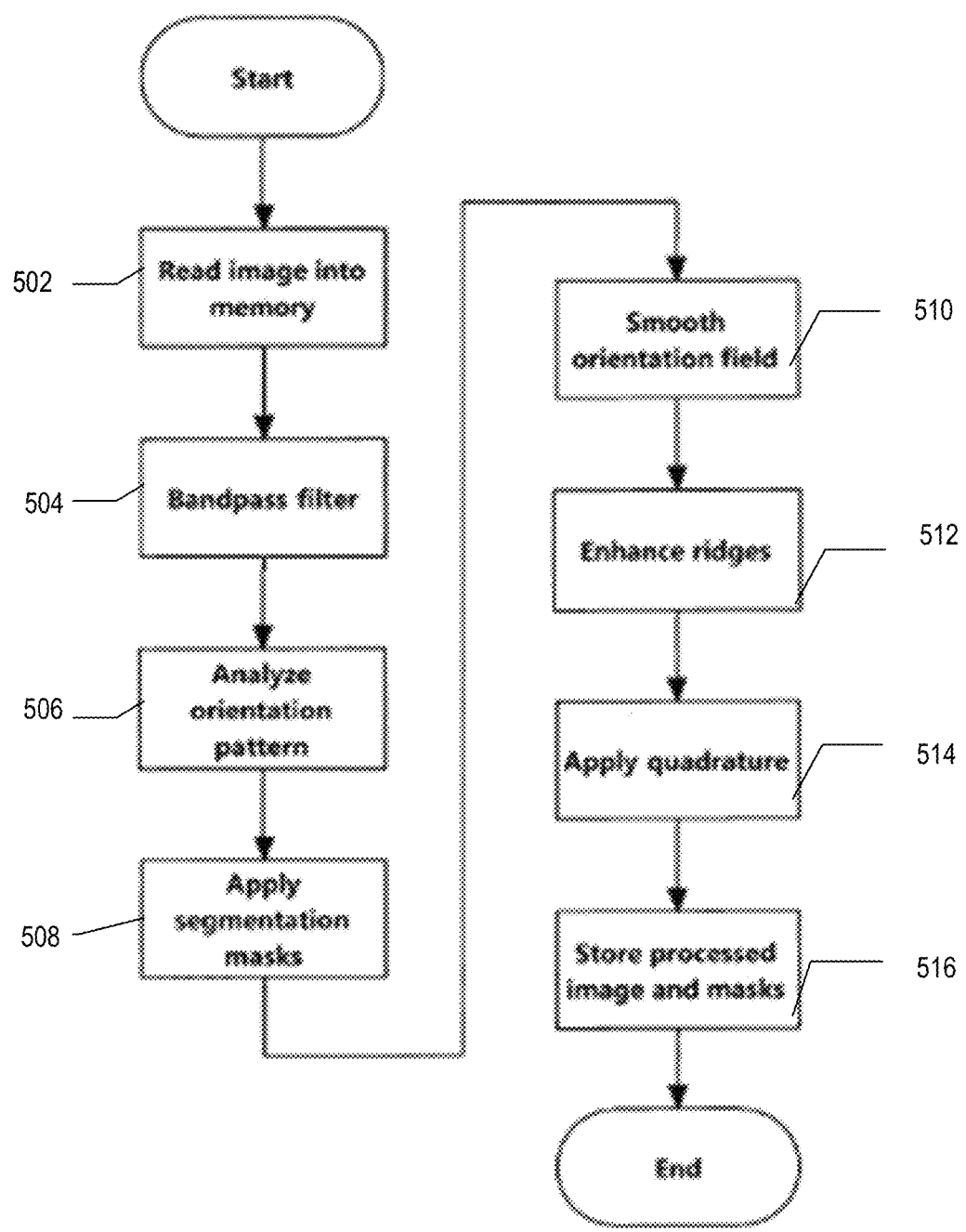
FIG. 5 is a flow chart illustrating an example process of converting an image into a high contrast representation of ridge flow.

As shown in FIG. 5, the process of converting an image into a high contrast representation of ridge flow begins in step 502, where the image is read into memory from a user-specified file.

In step 504, a bandpass filter can be applied. This is a filter that eliminates all frequency components of the image, except those lying within a specified range. This exploits the fact that ridges on human fingers tend to have a spacing that does not vary a great deal from 0.5 mm; the frequency range cutoff values allow for a variation either side of this value by a fairly generous factor of two. Clearly, therefore, it is necessary to know the image resolution, in order to convert this average ridge wavelength into a width expressed as a number of pixels. One effect of the bandpass filter is to eliminate the zero-frequency component, or "DC component"; this makes the mean intensity value equal to zero over any extended area of the image, which is part of the requirement for a normalized representation.

In step 506, the orientation pattern of the ridges is analyzed. This step retrieves a number of quantities, including the orientation of the ridge pattern at each point. Another quantity determined in the example embodiment is coherence. Coherence is represented by a number between 0 and 1, and is a measure of how well defined the orientation pattern is at each point. A value of 1 corresponds to the optimum situation, where all the intensity variation in the image is in one direction, e.g., perpendicular to the ridges, with no variation in the direction parallel to the ridges. A value of 0 indicates no preference for one direction over another, as would occur in a region of uniform brightness or with random image noise that was not directionally dependent.

The ridge orientation field, along with other relevant parameters such as coherence, can be obtained by a method that will be referred to as Principal Component Analysis. This process identifies the direction at each point in the image in which the intensity variation per unit is greatest; in a ridge pattern this is typically perpendicular to the ridges. Because the intensity gradient along any direction, which is the measure of the variation, can be positive or negative, the square of the intensity gradient is used. In particular, at each point the direction is identified for which the squared intensity gradient, taken along this direction and averaged over the neighborhood of the point, is a maximum. Best results are obtained if the radius of the neighborhood is about equal to the average ridge wavelength; using a smaller neighborhood results in oversensitivity to image noise, while too large a radius "smoothes out" the orientation field too much, and may result in inaccurate placement of the cores and deltas.

The direction Θ of maximal squared intensity gradient is given by:

$$2\Theta = \arctan(P/D)$$

where $$D = \text{mean}(g_x^2 - g_y^2)$$

$$P = \text{mean}(2g_x g_y)$$

and $g_x$ and $g_y$ are the image intensity gradients in the x and y directions respectively.

There are two values of (180 degrees apart) that satisfy this equation. This reflects the fact that orientation is an ambiguous quantity. For example, a road on a map is designated as running east to west, but traffic on that road may be traveling either east or west.

Two other quantities are extracted at this stage. These are:

$$R = \sqrt{(D^2 + P^2)}$$

$$E = \text{mean}(g_x^2 - g_y^2)$$

Both these quantities are always non-negative. The energy E is a measure of the total image variation without reference to direction, while R, the directional response, measures the total directionally dependent image variation. R is zero when the pattern is completely isotropic, i.e., when the average amount of variation is the same no matter which direction one moves within the image; it is equal to E when all the variation is along one direction, as for example in the case of a set of perfectly parallel lines. The quantity $C = R/E$ therefore always lies between 0 and 1, and can be used as a measure of the pattern's coherence, or how well the orientation of the pattern is defined. Very low coherence values occur in areas where the fingerprint is smudged or otherwise corrupted, as well as in most parts of the background; C is therefore one quantity that is useful in separating the print foreground from the background.

The quantities obtained in this analysis stage are used in the later noise removal stages, and they also provide important cues when performing segmentation.

Next, in step 508, segmentation is performed by applying a series of segmentation masks. A segmentation mask is an image consisting of a set of binary values for all points in the image. Points assigned a value of 1 are denoted "foreground"; points assigned a value of zero are denoted "background".

In an embodiment, three different segmentation masks are generated, based on three different quantities. A coherence segmentation is generated by assigning a value of 1 to all points where the quantity C, defined above, is greater than a threshold value. The threshold may be selected by experimentation to correspond to characteristics of the image. A value of 0.3 is typical of a coherence value at which the ridge orientation is readily discernible.

In a preferred embodiment, this mask is modified to fill in holes occurring at a singularity in the flow pattern (a core or delta point). At these points, the coherence drops to a very low value. This is not because the ridges are poorly defined at this point, but because the orientation varies rapidly over a small region of space. This leaves "holes" in the mask at these points, the size of the hole being roughly equal to the radius of the neighborhood used in taking the means of gradient quantities to calculate D and P above. This operation is referred to as morphological closure.

The coherence segmentation is normally effective in including all the fingerprint regions where the pattern can be interpreted with the human eye, and it masks out most of the background. However there are certain types of background features that show high directional coherence, such as handwritten annotations, ruled lines on the card or the grain of the surface on which the print was made. Thus, in a preferred embodiment, the coherence mask is supplemented by additional masks.

In the example embodiment, a second mask based on directional response is generated based on the quantity R defined above. This quantity is a magnitude rather than a dimensionless quantity such as coherence; it measures the amount in intensity per pixel displacement, by which the intensity varies in a directionally dependent manner. This mask eliminates background regions where the pattern is faint but highly linear. Many materials such as paper or wood exhibit a grain structure that is normally much fainter than the fingerprint ridges and may even not be discernible to the eye in the original image. This grain structure will result in high values for coherence, so that a coherence mask alone will erroneously include these areas as part of the foreground.

The directional response mask is generated by identifying all points where the quantity R is above a certain threshold. The threshold is selected based on the properties of the image, as follows.

The assumption is made that the fingerprint will occupy, e.g., at least 5% of the image. Therefore, the quantity $R_m$ is found, such that only 5% of the points in the image have a value $R > R_m$. If the foregoing assumption is valid, then this means that $R_m$ will be a value representative of points within the print foreground. Some foreground points will have a greater value of R; most will show a smaller value.

The threshold value $R_T$ is then set to $0.01 * R_m$. This allows the mask to include regions where R is significantly less than the 95-percentile value; however, it successfully masks out regions described above, namely parts of the background where there is a linear pattern corresponding to a very faint grain.

In this example embodiment, a third mask is generated based on the ridge frequency extracted from the pattern. First, a binary version of the enhanced image is generated by replacing all positive image values by 1 (white) and all negative values by 0 (black). Since the enhanced image is normalized, the values are symmetrical about zero, so the resulting binary image contains roughly the same number of on and off bits. Then, the borders of the black and white regions are identified. These are pixels whose binary value differs from the binary value of one or more of its neighbors. Next, since the direction of the ridge normal is already known, the number of on/off transitions per unit distance normal to the ridges is examined for each part of the image. The ridge frequency is half this value.

The mask is defined by selecting points for which the measured ridge frequency and the theoretical average frequency differ by less than a relative factor of 0.4. That is, if $f_m$ is the mean frequency, f will lie between $f_m/1.4$ and $1.4 * f_m$.

The frequency mask shows holes similar to those in the coherence segmentation mask, and for the same reason; the core and delta points are points at which the orientation is ill-defined, therefore the frequency, measured along a particular direction, is also not well-defined. These holes are filled in using the same procedure as in the coherence mask.

The frequency-based segmentation filters out parts of the background containing features such as ruled lines or handwritten notes. Such patterns are highly linear, but they are typically isolated lines rather than a series of parallel lines such as is found in the ridge pattern.

The three segmentation masks described above are preferably combined into one final segmentation mask by an intersection operation. That is, a point is marked as foreground in the final mask if and only if it is a foreground point in all three individual masks.

In step 510, the orientation field is smoothed. This can reduce, and may eliminate, the effect of isolated linear features that are not associated with the ridges, such as skin folds, or handwritten lines drawn across the pattern.

An accurate prior determination of the orientation field is preferred, since knowing the orientation at each point allows the process to avoid smoothing out the pattern in the cross-ridge direction, which may eliminate ridge features of interest. For this reason, in certain embodiments the process seeks to remove as much noise as possible from the derived orientation pattern before proceeding to the second stage.

The orientation, which is an angular measurement, can be smoothed by a method of averaging angles, for example: Express the angle as a vector quantity, e.g. a vector V with components $Vx=\cos(\Theta)$ and $Vy=\sin(\Theta)$. Vx and Vy are smoothed by taking a weighted mean over the image or a neighborhood within the image. The quantity is converted back to an angle by taking the angle defined by the smoothed components mean (Vx) and mean (Vy).

The example embodiment deals with two complications arising in the case of ridge orientation patterns. The first is that orientation is an ambiguous quantity, as noted above. An orientation of 30° is indistinguishable from an orientation of 150°. example embodiment compensates for this factor by doubling the angle, then smoothing the doubled angle (which we denote $\Phi$) by means of a weighted averaging, and finally halving the result.

The second complication is the core and delta points in the fingerprint. These represent singularities in the orientation field, and it is not practical or desirable to directly apply smoothing at these points. A simple smoothing generally has the effect of shifting the core or delta point to the wrong place.

A core point is characterized by the fact that, if a closed path is traced around the point and follow the behaviour of the orientation, this vector rotates by 180 degrees for a single clockwise traversal of the closed path. The doubled angle therefore rotates by 360 degrees. The same behavior happens at a delta point, except that the rotation is in the opposite sense. In other words, the cores and deltas can be treated as generating spirals in the orientation field, the spiral flows being superimposed on an otherwise continuous flow pattern. The doubled angle $\Phi$ over the image can be expressed as:

$$\Phi=\Phi_C+\Phi_D$$

where $\Phi_C$ is the residual field, and is $\Phi_S$ the spiral orientation field resulting from the presence of the cores and deltas.

At any point (x,y) in the image, the spiral field from a core point P is the bearing angle from the point (x,y) to the point P. This has the desired property that when any closed path is traced around P, the angle does one complete rotation.

Similarly the spiral field around a delta point is taken as the negative of the bearing angle. This gives the required rotation of the vector, in the opposite direction to the direction of the path traversal.

Core and delta points in the original $\Phi$ field are located in the example embodiment using a quantity called the Poincaré index. This is obtained using the spatial derivatives of the angle (in mathematical language, it is the curl of the x and y spatial derivatives of the angle), and its value is $2\pi$ at a core point, $-2\pi$ at a delta, and zero every where else.

In summary, in an example embodiment the orientation quantity is smoothed using the following steps:
1. Calculate the doubled angle $\Phi$;
2. Locate the core points using the Poincaré index;
3. Calculate the spiral field across the image for each core and delta point, and sum these to give $\Phi_S$;
4. Subtract $\Phi_S$ from $\Phi$ to give $\Phi_C$;
5. Smooth $\Phi_C$ using a weighted neighborhood average;
6. Add $\Phi_S$ back to the result to give a final smoothed field $\Phi$ with the core and delta points preserved.

In step 512, ridge enhancement is performed. The ridge enhancement process is an image smoothing operation that smoothens intensity variations in the direction parallel to the ridges, while those in the perpendicular direction are largely unaffected. The example embodiment seeks to avoid smoothing in the cross-ridge direction, since this would eventually destroy the pattern of ridges and valleys, which are features of interest to be enhanced rather than diminished.

Ridge enhancement is a process for reducing or eliminating irregularities in the ridge pattern, making it conform more closely to a theoretically ideal ridge pattern. Ideally the pattern resembles a wave pattern with no breaks in the waves, with the crests and trough having the same amplitude everywhere. In this idealized ridge pattern the intensity is constant when one traces a path in the image parallel to the ridges.

In the example embodiment, noise consisting of small intensity fluctuations in an image is reduced or eliminated by applying a suitably chosen smoothing filter, which replaces the intensity value at a pixel by a value calculated as a weighted average of pixels in a restricted neighborhood. A modified process is desirable to ensure that any smoothing takes place only in the direction parallel to the ridges, otherwise spatial averaging may reduce or eliminate the ridges themselves.

In an embodiment, a method described as oriented diffusion is employed. This exploits the fact that, if an intensity profile is taken along the direction of the ridge orientation, the humps and dips in the profile are related to the second spatial derivative of the intensity taken along that direction. This can be seen by considering the intensity I as a function f of spatial location x, and expressing f as a Taylor expansion centered on a reference value $x_0$:

$$f(x_0+d)=f(x_0)+f'(x_0)d+[f''(x_0)]d^2/2+\ldots$$

where $f'(x_0)$, $f''(x_0)$ etc are the $1^{st}$, 2nd etc. derivatives of f at the point $x_0$.

If we now take a small interval centered on $x_0$, for example allow d to range from $-r$ to $+r$ for some r, and examine the mean of the above expression over the interval, we see that the term in f' vanishes because the mean value of d is zero. An approximation to the mean value can therefore be made by taking:

$$\text{mean}(f) \approx f(x_0)+[f''(x_0)]*\text{mean}(d^2)/2$$

Where the term "mean ($d^2$)" is constant, and simply depends on the size of our chosen interval. The equality is only approximate, because the full Taylor expansion contains higher order terms.

In the example embodiment, oriented diffusion is performed as follows: (1) Obtain the second spatial derivative f' of intensity, taken at each pixel in the direction of the ridge orientation; (2) Average this quantity over a very small neighborhood of the pixel, where the size of the neighborhood used is somewhat less than the average ridge wavelength; (3) Apply the above formula to estimate the mean intensity; and (4) Repeat the above steps as often as desired.

Experimentation has shown that improvement in the ridge definition is rapid for the first few iterations of the diffusion process, but eventually a plateau is reached at which further application of the process results in little noticeable improvement. This happens after somewhere between 50 and 100 iterations, depending on the quality of the initial image. The number of iterations may be set by experimentation based on typical input image quality.

In step 514, a quadrature operation is applied to the image, allowing the intensity at each point to be expressed in terms of the amplitude and phase of a sine wave. The quadrature operation follows the processes disclosed by Larkin and Fletcher for obtaining the quadrature of a two-dimensional image function. The original function, together with its quadrature, can be combined to produce a complex valued function representing a periodic wave, and the phase at any point can be obtained by examining the relative values of the real and imaginary parts of the complex function.

Obtaining the quadrature requires specifying the direction of the wave normal at each point. This is at right angles to the ridges, but as noted above, it is only possible to specify the ridge orientation as being in one of two directions, 180 degrees apart. This ambiguity in the wave direction results in a corresponding ambiguity in the phase; however, the quantity of primary interest in the height of the wave at each point, measured by the cosine of the phase. The same cosine value is found irrespective of which of the two possible directions was taken as the wave normal.

The end result, then, is a map showing the cosine of the phase. In such a representation the wave crests all have the same intensity value (+1) and the troughs all have the same value (−1). Prints are normally taken using a dark marking medium on a lighter background and sometimes this relationship switches when the prints come from photographs; therefore the wave crests correspond to the inter-ridge valley axes and the troughs correspond to the ridge axes. The amplitude is discarded; the cosine of the phase is the normalized image, since the cosine values lie between −1 and +1.

Figure 6A:
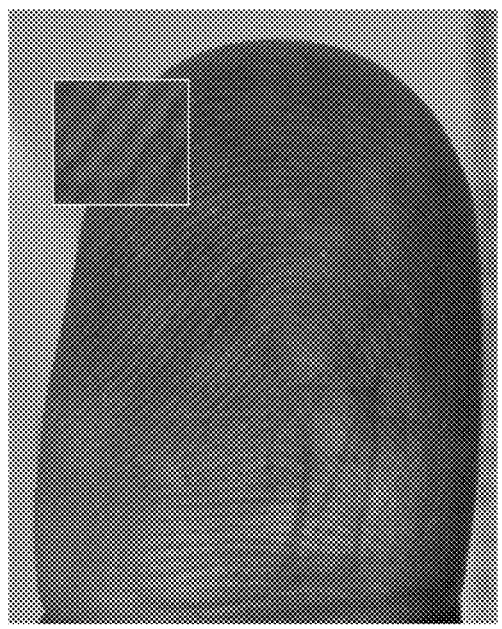
FIG. 6A is an example of a fingerprint specimen.
Figure 6B:
FIG. 6B is an example of a high-contrast representation of the fingerprint of FIG. 6a produced using the process of FIG. 5.

Finally, in step 516, if applicable, the resultant smoothed and normalized image and the foreground mask image are each written to user-specified storage locations. To illustrate the results of the example process of FIG. 5, FIG. 6A is an example of a fingerprint specimen and FIG. 6B is an example of a high-contrast representation of the fingerprint of FIG. 6A. In this particular high contrast representation, ridges are shown in black and furrows as white.

The photograph-to-ridge rendering process can be applied iteratively to account for conversion of ridges of various widths. Based in its intrinsic quality metric, the results can be composited to create a single image that shows the optimal rendering of ridges.

Next, focus and image resolution work hand-in-hand to achieve a sharply focused image with an established resolution. Modern, e.g., smartphones provide control access to the onboard camera to set focus distance through software. A device configured as described herein achieves focus and resolution control by capturing a series of images at different distances, evaluating each photograph and selecting the one that is in best focus. The best focus image, based on the given on board mobile camera specifications, is taken from a continuous stream of full resolution camera frames across a (small) configurable number of seconds and focus distances. The camera begins from its starting position and moves incrementally to achieve the image in best focus guided by real-time feedback on focus quality.

The focus in each frame can be determined by taking the average per pixel convolution value of a Laplace filter over a small region of the full resolution image that the target's skin encompasses. The size of this region is adjusted based off of the current focal distance reported by the camera to reduce the chance that background is included in target region, thus negatively impacting the averaged value. For larger focal distances, the viewed target is smaller in pixel measurements, so the region's size is reduced to better guarantee skin coverage within the entire region. Likewise, smaller focus distances have larger target regions.

After each frame's focus value is calculated, the camera's focus distance is adjusted in attempt to better the focus value upon the next frame's capture. The determination of which direction (closer or farther) to adjust the focus is based on the difference of the focus values of the last two frames in the following manner: 1) if the focus is getting worse, then reverse the direction of focus distance adjustment, 2) if the focus is getting better, maintain the direction of focus distance adjustment. Initially the incremental step that the focus distance is adjusted is large (and is configurable), but after each focus distance adjustment, the magnitude of the incremental step is slightly reduced. The adjustment of the incremental step continues until the incremental step is reduced to a configurable minimum value. Since the "ideal" focus distance is constantly changing due to both the unsteady camera and the unsteady target, this method good for quickly adjusting the focus distance to the ballpark of where it should be to have the target in focus, and then minimally adjusted for the remainder of the stream to capture a frame of the moving target at a locally maximized focus value.

Figure 7:
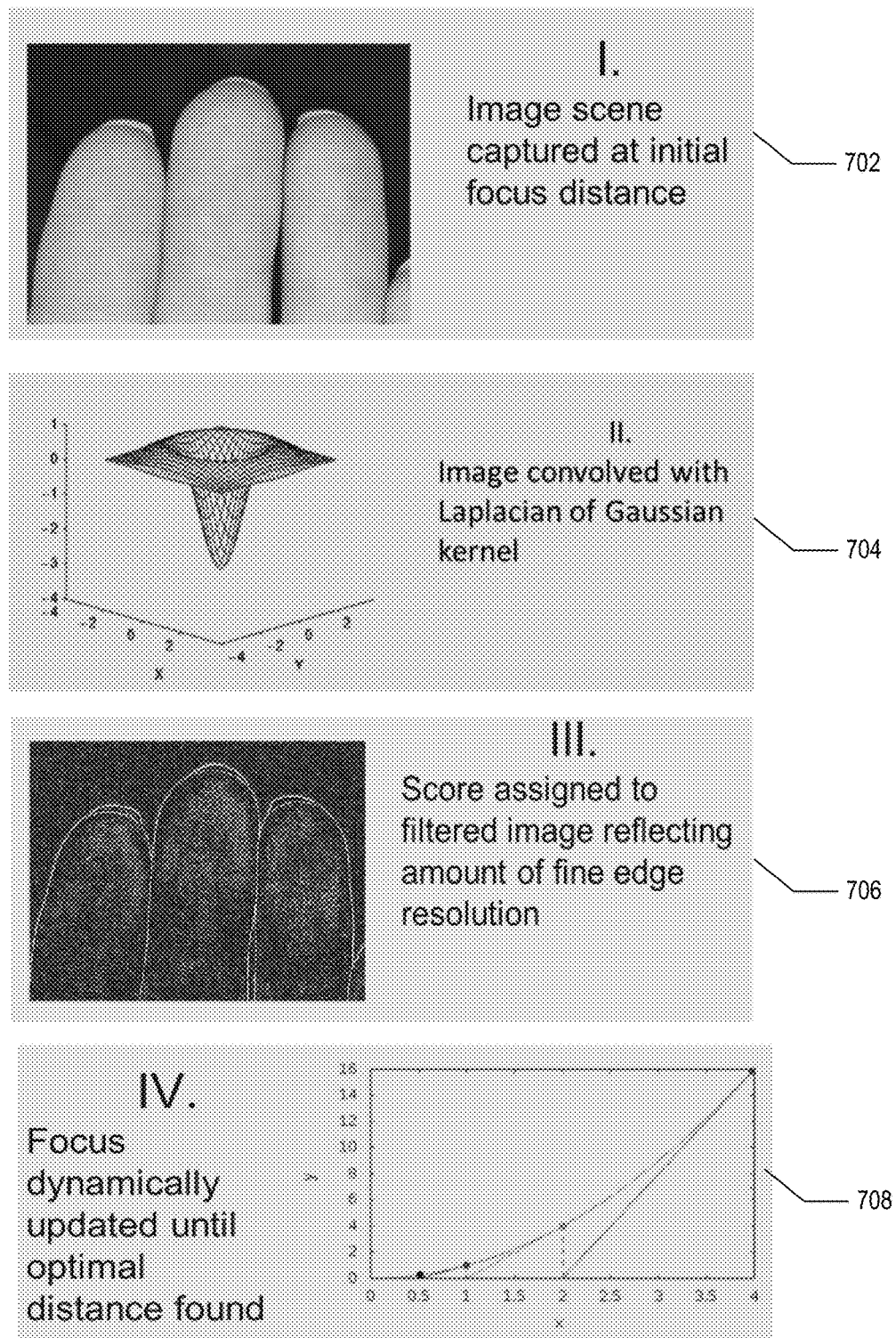
FIG. 7 is a flow chart illustrating an example process for automated focusing for fingerprints in accordance with one embodiment.

The steps involved in automated focusing for fingerprints is presented in FIG. 7. First, in step 702, an image is captured at an initial focus distance. Then in step 704, the captured image is convolved with Laplacian of Gaussian kernel. In step 706, scores are assigned to a filtered image reflecting the amount to fine edge resolution. In step 708, the focus is then dynamically updated until an optimal distance is found.

Once focus distance is established, it becomes the basis for calculating image resolution. The resolution of the best, full resolution image is derived from the focus distance, $F_D$, recorded at the time the image was taken. The resolution of the image is equal to $(W*F_L)/(S_x*F_D)$ where W is the width of the camera image, $F_L$ is the focus length of the camera and $S_x$ is the physical sensor size, e.g., the width in this case, of the camera. In the absence of the ability to control focus distance, the conventional solution has been to place an object of known dimension in the image. Such "target" based techniques can be used with older equipment where camera controls are not provided. Computing image resolution using a target is a well understood process and presented herein by reference.

The next image enhancement process involves the detection and elimination of noise artifacts that appear in photographic images. Among these artifacts are wrinkles and other creases that are present in the finger but are reduced during compression during capacitance or optical contact scanning.

Images of fingertips exhibiting dermal ridge patterns often include creases and wrinkles. These are peak or valley features whose width ranges from smaller than that of a dermal ridge to several times that of a dermal ridge. The presence of wrinkles in a fingerprint image can interfere with identification, by spoofing ridge endings or bifurcations, misleading orientation field estimation based on directional energy, or by causing some regions of the print to fail local quality tests. This can result in otherwise informative regions of the dermal ridge pattern being heavily discounted or removed from consideration.

Very large or small wrinkles can be effectively eliminated by bandpassing, but wrinkles whose width is within a factor of 3 of the ridge width require more sophisticated treatment.

This is a problem of source separation. In processing images for submission to a biometric identification system, the goal is to retain intensity variations caused by dermal ridges and discard intensity variations caused by other sources. In the spatial domain these patterns overlap, but in the frequency domain they are separable to the extent that they differ in either frequency or orientation.

The orientation field of the dermal ridges is smooth and continuous across the fingertip except at cores and deltas. Furthermore, some regions of the fingertip tend to follow a particular orientation: ridges near the bottom of the fingertip, just above the distal flexion crease, have an orientation very close to horizontal. Ridges near the top of the fingertip are generally arch-shaped. By contrast, the area in the middle of the fingertip does not have a predictable orientation.

These characteristics of dermal ridge patterns are not shared by wrinkle patterns, which enables us to mask them out by the following process: (1) copy the region of interest to a buffer; (2) apply a windowing function to the image, such as the Hamming, Hann, or Gaussian window; (3) apply a 2D Fourier transform to the windowed image; (4) rotate each quadrant of the FFT image 180 degrees in order to relocate the DC component and low frequencies from the corners to the image center. In the representation, the orientation of each frequency component is determined by its bearing relative to the image center; (5) for each component on the image whose orientation exceeds a threshold angle from the predicted orientation (15 degrees, for instance), set its value to zero. The DC component should remain unchanged; (6) rotate the quadrants 180 degrees back to their original positions, and apply the inverse Fourier transform; (7) replace the region of the original image with a weighted sum of the original image and the inverse FFT image, where the weight of each pixel of the reverse FFT image is proportional to the windowing function applied prior to the FFT.

Figure 8:
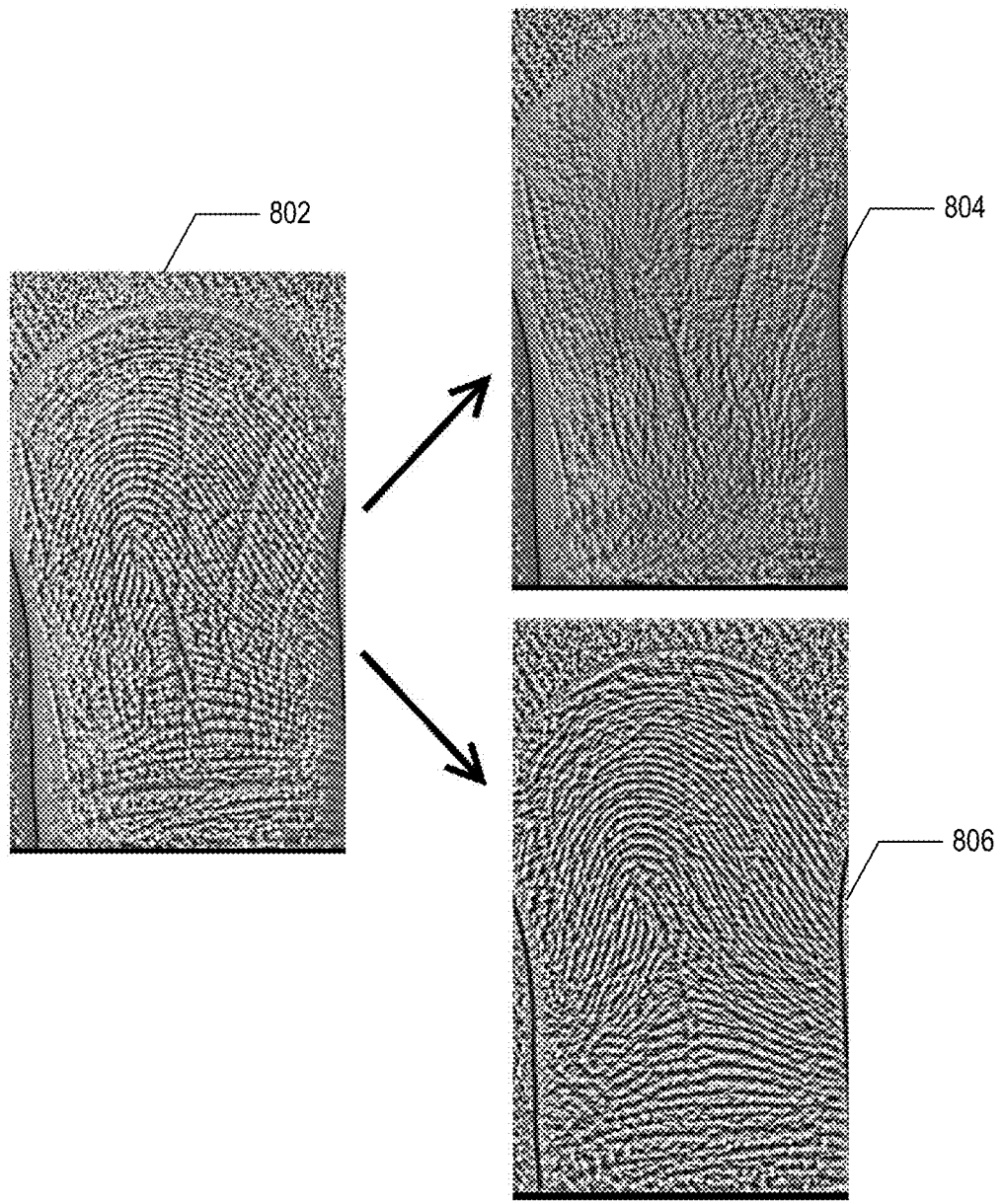
FIG. 8 illustrated a finger image being transformed into two images: one showing ridges and the other showing wrinkles according to the process of FIG. 9.
Figure 9:
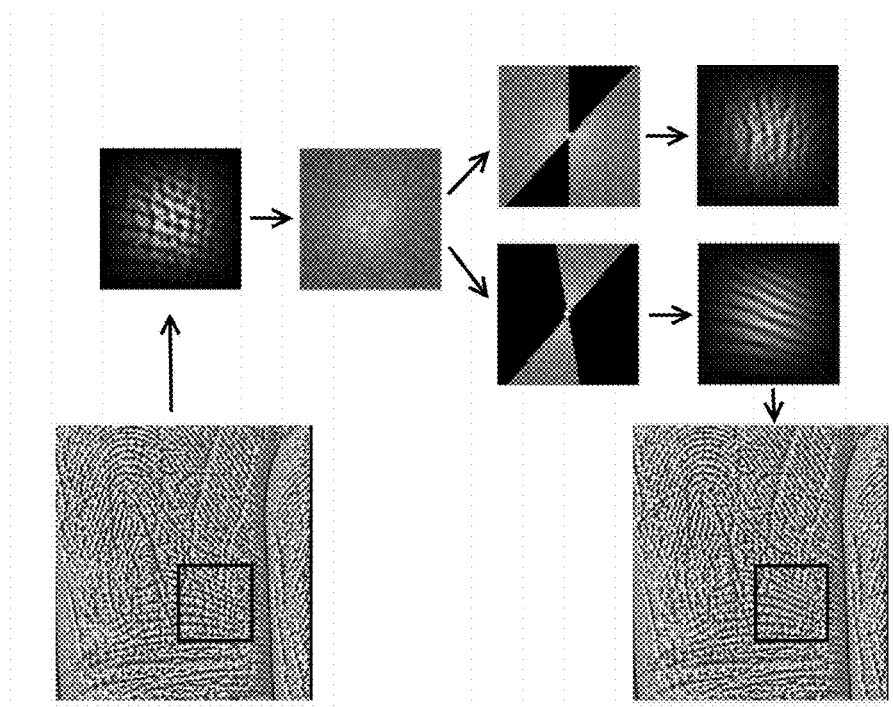
FIG. 9 illustrates an example wrinkle removal process according to one embodiment.

This procedure can be repeated across all regions of the image where the orientation field can be accurately estimated. FIG. 8 shows a finger image 802 transformed into two images: one image 804 showing ridges and the other image 806 showing wrinkles. FIG. 9 presents a schematic of the wrinkle removal process as herein described. An original finger image with wrinkles is shown from the left in the bottom row of images in FIG. 9, and a region of interest of the image where the wrinkle removal process is to be applied is shown within a rectangular bounding box. The first image from the left in the top row of images shows the result of a 2D FFT of the windowed subimage of the region of interest in FIG. 9. The second image from the left in the top row of images shows the result of rotating the FFT image to relocate the DC component and low frequencies from the corners to the image center. The rotated FFT image is then separated into two rotated FFT subimages: the lower rotated FFT subimage is generated by setting those frequency components having orientations exceed a threshold angle from the predicted orientation to zero, and the upper rotated FFT subimage is generated by setting those frequency components having orientations below the threshold angle from the predicted orientation to zero. Hence, the upper rotated FFT subimage contains mainly the wrinkle information whereas the lower rotated FFT subimage contains mainly the dermal ridges information, thereby separating the wrinkles from the dermal ridges. As can be seen in both subimages, the DC component at the center remains unchanged. The two FFT subimages to the right of the two rotated FFT subimages are obtained by rotating the two rotated FFT subimages back to their original positions, and the lower FFT subimage containing horizontal patterns is the wrinkle-removed FFT image of the region of interest in the original image. Finally, an inverse FFT is applied to the lower FFT subimage, and the result of which is used to generate a replacement image to replace the region of interest in the original image. In some embodiments, the replacement image is the weight sum of this inverse FFT subimage and the original region of interest. Hence, the second image in the bottom row of images shows the original image with a wrinkle-removed region of interest.

While dermal ridges can be considered permanent biometric identifiers, the presence, location, and orientation of skin creases can be used to establish identity as well.

The time span over which different kinds of creases remain useful ranges from temporary wrinkles lasting for minutes or hours, to deep creases such as the flexion creases of the digits and major creases of the palm, attributes of which can last for a lifetime. Certain arrangements of palmar creases, e.g. the 'simian crease', are used as diagnostic signs for genetic abnormalities.

As a biometric, digital flexion creases and palmar creases have the advantage of being long-term features that are substantially larger than dermal ridges, allowing them to be detected from a greater distance or with a lower-resolution image sensor.

Some of the characteristics that can be used to compare a pair of captured crease images are: (1) the locations of points of intersection between palm creases, which could be compared using an iterative closest point procedure to determine the best fit projective transformation between the two sets of points, and calculating the error according to the distances between point pairs; (2) a collection of distances measured between a parallel pair of creases, within a landmark-defined region; (3) the count and distribution of individual wrinkles that make up a flexion crease at each joint of the digits could be compared, using local binary patterns (LBP) or another image-based feature set to measure the similarity between brightness and contrast-normalized images of the skin of the creases.

Figure 23:
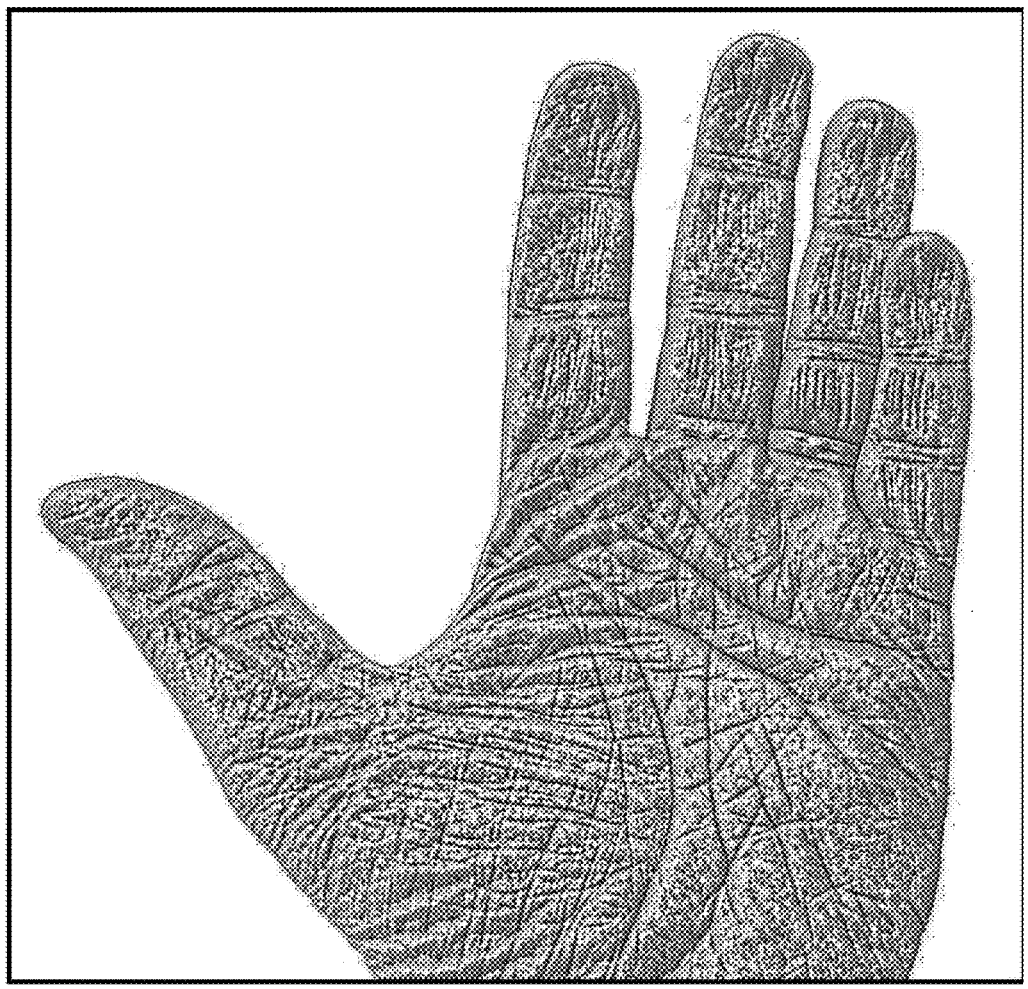
FIG. 23 shows the abundance of data available through wrinkles on the hands that will be visible at distances where fingerprints cannot be captured.

FIG. 23 shows the abundance of data available through wrinkles on the hands that will be visible at distances where fingerprints cannot be captured. The RSM matching method described below can be used to match these wrinkle features similar to the way it matches the friction ridges of the finger and palm.

The next image enhancement process involves image flattening. Fingers represent 3-dimensional objects that are captured differently by a camera lens than they are captured by contact scanning. The systems and methods described herein can achieve flattening capability in two ways: The first flattening method develops a 3-dimensional approximation of the finger surface as a vaulted shape. Once this shaping has been fitted to a specific fingerprint, the fingerprint can be transformed to its flat equivalent. The second flattening method entails a series of steps as follows: (1) Run horizontal lines across the image or superimpose a grid on the image, (2) Segment the lines whenever they cross a ridge centerline; (3) Sort the segments by length; (4) Find all the segments below a certain length; (5) find the median dimension for the ridge-to-ridge distance; triangulate all the points in the image; and transform the triangulation stretching all the "short" segments to the median dimension.

Figure 10:
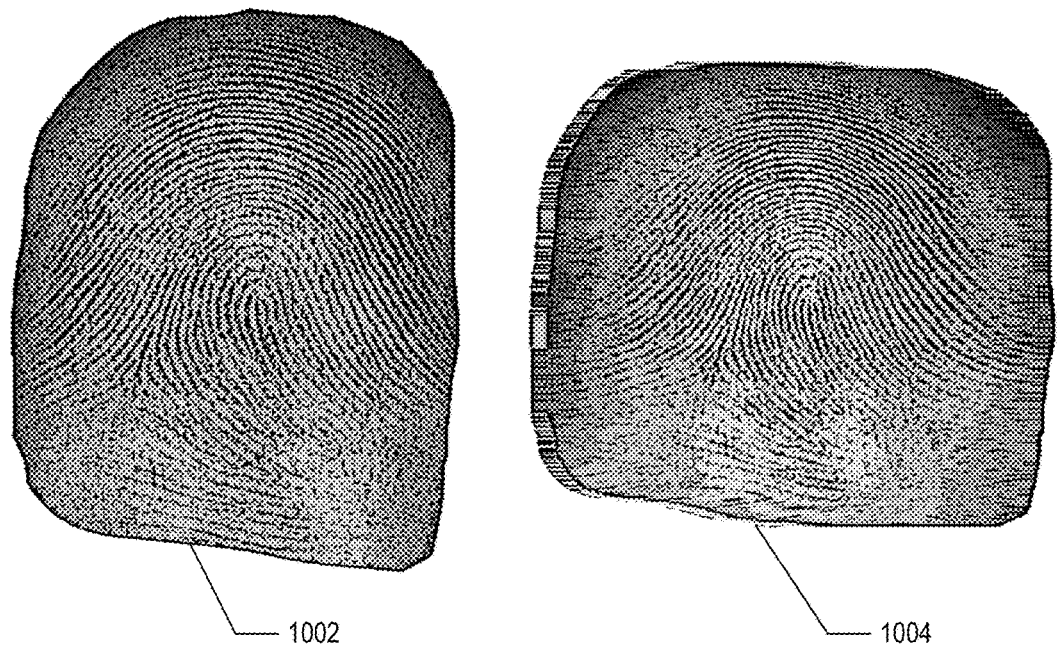
FIG. 10 shows an original "unflattened" fingerprint image and a "flattened" fingerprint image produced according to a described fingerprint flattening process.

FIG. 10 shows an original "unflattened" fingerprint image 1002 and "flattened" fingerprint image 1004 produced according to the above process(es).

The "slap" or "rolled-equivalent" images obtained by the MEBA are intended to conform to the NIST draft standard for Fast Ten-Print Capture (FTC) devices, with specific requirements for gray-level contrast and geometric accuracy. These standards mirror earlier requirements used to ensure that live-scan equipment can be widely accepted as a substitute for scanned fingerprint cards.

Figure 11:
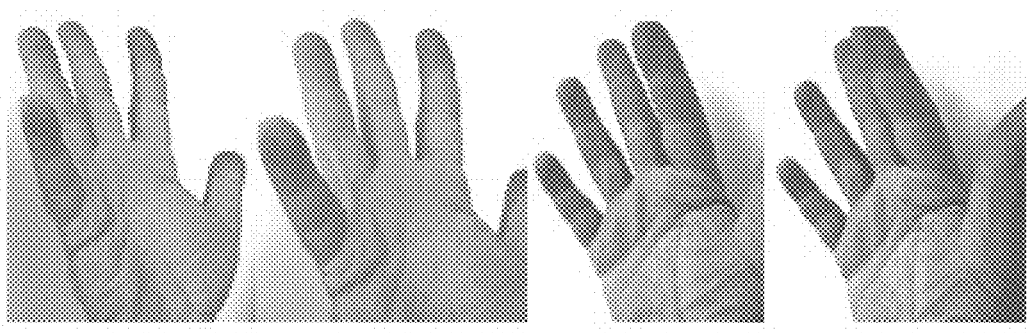
FIG. 11 shows various "poses" that can be captured to create sufficient information to create a rolled-equivalent fingerprint in accordance with one embodiment.

Prints captured with a smartphone can either be the equivalent of "flats" (or slaps) or "rolls". Flat prints just show the visible surface of the print whereas rolls show the visible area as well as the sides and part of the tip. To create flats, a single image will suffice, however, rolls require multiple photographs that are ultimately woven together. FIG. 11 shows various "poses" that can be captured to create sufficient information to create a rolled-equivalent fingerprint from a, e.g., smartphone image. To capture these images, the hand remains stationary and the smartphone is moved in a "waving" motion across the hand. The equivalent of rolled fingerprints can be achieved by using techniques that create 3-dimensional images from multiple 2-dimensional images.

The essence of an image is a projection from a 3-dimensional view onto a 2-dimensional plane, during which process the depth is lost. The 3-dimensional point corresponding to a specific image point is constrained to be on the line of sight. From a single image, it is impossible to determine which point on this line corresponds to the image point. If two images are available, then the position of a 3-dimensional point can be found as the intersection of the two projection rays. This process is referred to as triangulation. A key for this process is the relations between multiple views that convey the information that corresponding sets of points must contain some structure and that this structure is related to the poses and characteristics of the camera. FIG. 11 shows multiple poses of a hand that can be used to create 3-dimensional fingerprint images. In FIG. 11, each of the four subimages shows a different pose of the hand. For example, the two subimages on the left show two poses where the pinky finger is in front of other fingers, whereas the two subimages on the right show two other poses where the pinky finger is all the way in the back.

Even with image improvements, there will still be cases where image quality is poor due to a variety of factors including but not limited to poor lighting, lack of focus, movement of the subject or occlusion. If any of these factors occurs in a photograph, there is not sufficient information in the single image to overcome the problem.

One technique for improving image quality is to capture more than on image. Smartphones are capable of capturing multiple images in succession as a "burst" of photographs or alternatively capture series of images through video. These bursts can help improve quality for several reasons including but not limited to the following.

Figure 12:
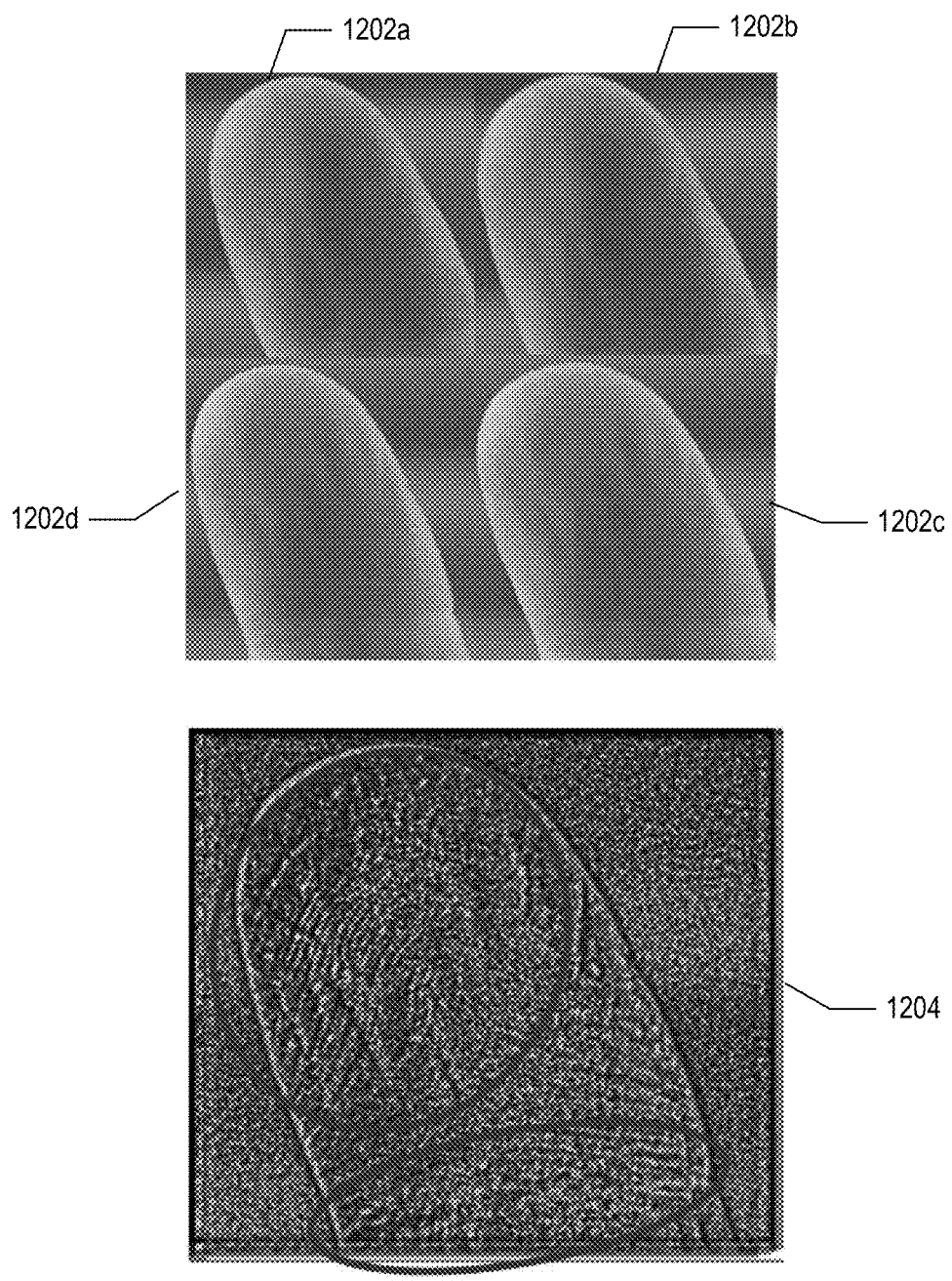
FIG. 12 shows an example of ridge structure in composite image rendered from a burst of images using super-resolution techniques in accordance with one embodiment.

First, using super-resolution techniques, multiple pictures of the same finger can be composited into a single image of improved quality. Super-resolution is a technique for extracting information from multiple, but slightly different images of the same subject. Given the slight differences in the images, it becomes possible to infer resolution at a level finer than the resolution of the individual images. Super-resolution is a well understood and documented technique that is herein presented by reference. FIG. 12 shows an example of ridge structure in composite image 1204 rendered from a burst of images 1202a-d using super-resolution techniques.

Second, several images from the same finger provide improved "coverage" to resolve areas where detail might be lost due to reflection or occlusion. In the case of mobile devices, the best finger image is typically the finger directly in front of the camera lens. If multiple images are captured rather than a single image, the images can be composited into a single image where each finger represents its best picture. For this technique to work best, the mobile device should be moved during the image capture process to obtain shots of each finger directly in front of the camera.

Multiple images captured while moving the camera across the hand will ensure that all fingers are captured while positioned in front of the camera lens to eliminate lens-related distortion. Thus, it is possible to capture several fingers in less time than conventional scanning captures a single finger.

One method for handling multiple images is to employ a "triptych" methodology. Historically, a triptych is an artistic work consisting of multiple panels (typically 3). In the present invention, the triptych concept involves capturing multiple pictures (typically 3) by moving the target to a new location so a different finger is directly in front of the camera. This technique will capture the index, middle and ring fingers in succession through 3 separate photographs. A fourth can be added for the little finger but it is likely the image of the little finger captured in conjunction with the ring finger will be of good quality negating the need for a separate photograph of the little finger. In terms of user interaction, the triptych can be employed as three separate "stops" for the screen-based target where images are captured at each stop. Or, the target can move on the screen and the user simply follows the hand in the target. Pictures are captured automatically as the fingers pass in front of the camera as established by the position of the target.

In the case of the triptych method, no other processing—such as stitching or compositing—is applied to the image. The image positioned in front of the camera is the one that is chosen and used.

The heart of the afterburning approach noted above is the Ridge-Specific Marker ("RSM") Algorithm, which is a graph-based method for capturing curve detail and relationships to describe objects that can be articulated as line forms. In the case of fingerprints, latent prints can be mapped to corresponding reference prints by matching the corresponding curvatures and locations within the friction ridges for multiple groupings.

Figure 13:
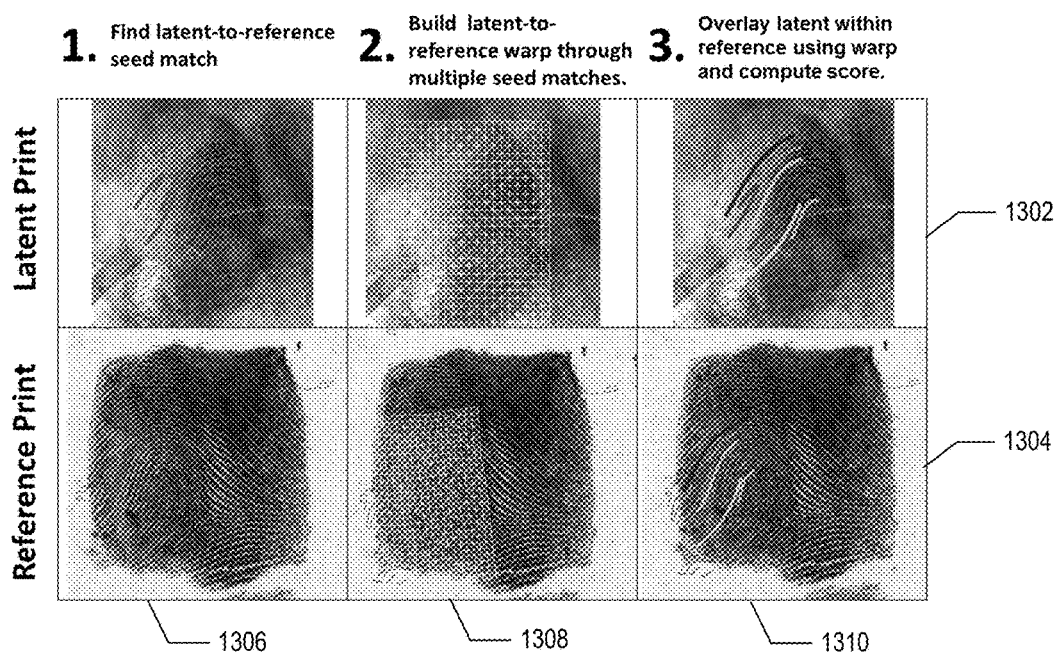
FIG. 13 shows an overview of a "ridge-centric" matching process when applied to latent fingerprint matching in accordance with one embodiment.

FIG. 13 shows an overview of the "ridge-centric" matching process when applied to latent fingerprint matching. The top row 1302 in this figure illustrates the latent print and the bottom row 1304 shows the corresponding relationship within the reference print. The first column 1306 illustrates the construction of "seeds" in the form of Bezier curves that match in latent and reference space. The second column 1308 illustrates the creation of the "warp" that captures the transformation of ridge structure from latent space to reference space due to the elasticity of skin. The third column 1310 shows the result, which is a direct mapping of the latent into reference space.

This recognition method deploys a unique method that establishes how well one fingerprint will overlay over another. The overlay can be combined with a score that provides a quantitative assessment of the fit between prints with the objective of determining whether two fingerprints came from the same finger. This method is important when dealing with fingerprint photographs from smartphones since there are many factors, e.g., focus, movement, and image occlusion due to lighting, which can cause difficulty during the matching.

Since the RSM-based method does not rely on minutiae, it is very useful when fingerprint data are sparse. One such application takes the form of an "Afterburner" where a match is made using a minutiae matcher returning a set of ten reference prints for the matched subject. The Afterburner is then applied to this returned set to ensure every finger returned, e.g., by the AFIS matches its respective mate captured by a device configured as described herein.

Figure 14:
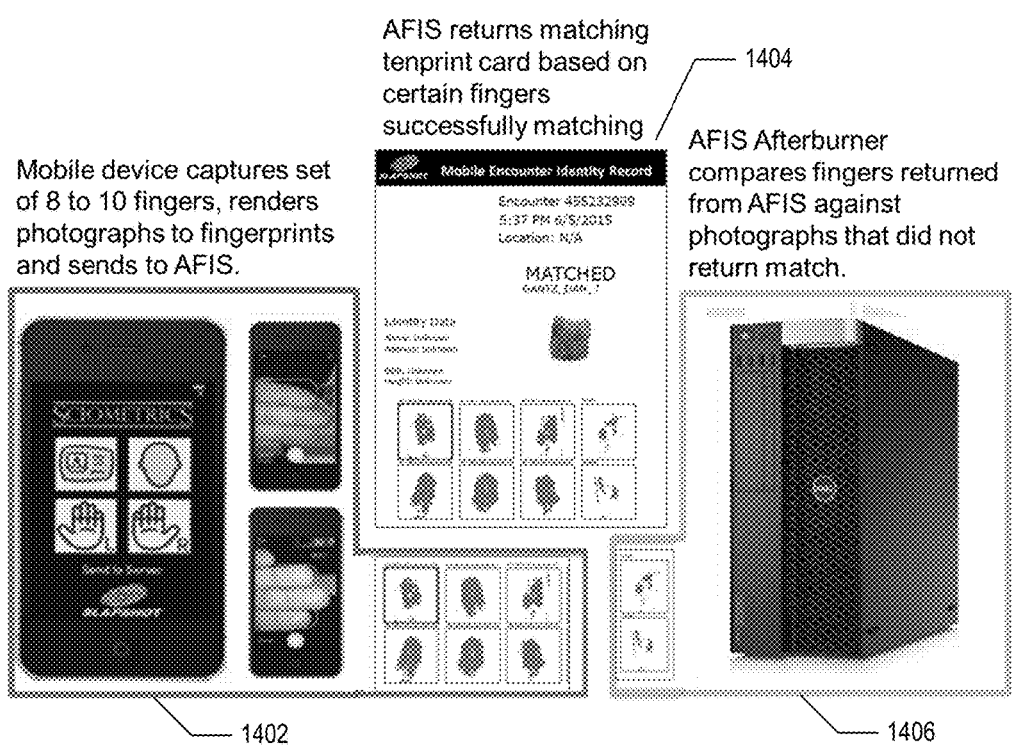
FIG. 14 illustrates the process of applying and Afterburner applied to images captured and returned from an AFIS search in accordance with one embodiment.

FIG. 14 illustrates the process of applying and Afterburner applied to images captured and returned from an AFIS search in accordance with one embodiment. In step 1402, a device, such as a mobile device, captures a set of images of fingers, renders the images to fingerprints and sends them to an AFIS. In step 1404, the AFIS returns matching fingerprints base don successful matching of the rendered fingerprints. In step 1406, the afterburner process can be used to compare fingerprints returned from the AFIS that did not match the rendered fingerprints.

FIG. 15 shows the end-to-end process for converting, e.g., a smartphone image to a viable fingerprint. The table within the figure outlines the steps for generating the fingerprint image. Moreover, the upper right image in FIG. 15 shows a smartphone image of the fingers without applying the fingerprint generating process, whereas the lower right image in FIG. 15 shows fingerprint outputs after applying the fingerprint generating process on the upper right image. It should be noted the target output is a "slap" image of 3 or 4 fingers since a fingerprint slap is the most common form used for searching. Also, thumbs can be captured with an additional photograph (two thumbs placed together in a single photograph). Once a photograph is taken, the steps to develop it into a fingerprint involve:

(1) Locating hands in a smartphone image (step 1502).
(2) Isolating fingerprint area (step 1504).
(3) Separating ridges and furrows through contrasting (step 1506).
(4) Generating a high contrast image separating ridges and furrows (step 1508).
(5) If multiple photographs are taken, find corresponding reference points that can be used to link the photographs together (step 1510).
(6) Weaving multiple images into a composite view (optional) (step 1512).
(7) Compression of images using WSQ or JPEG2K.
(8) Location of minutiae on the high contrast image.
(9) Generation of an AFIS query file. This file will be ANSI/NIST-ITL 1-2011 (AN2k11) and/or EBTS 9.4 compliant for compatibility with other biometric information systems.
(10) Submission to an AFIS.

Figure 16:
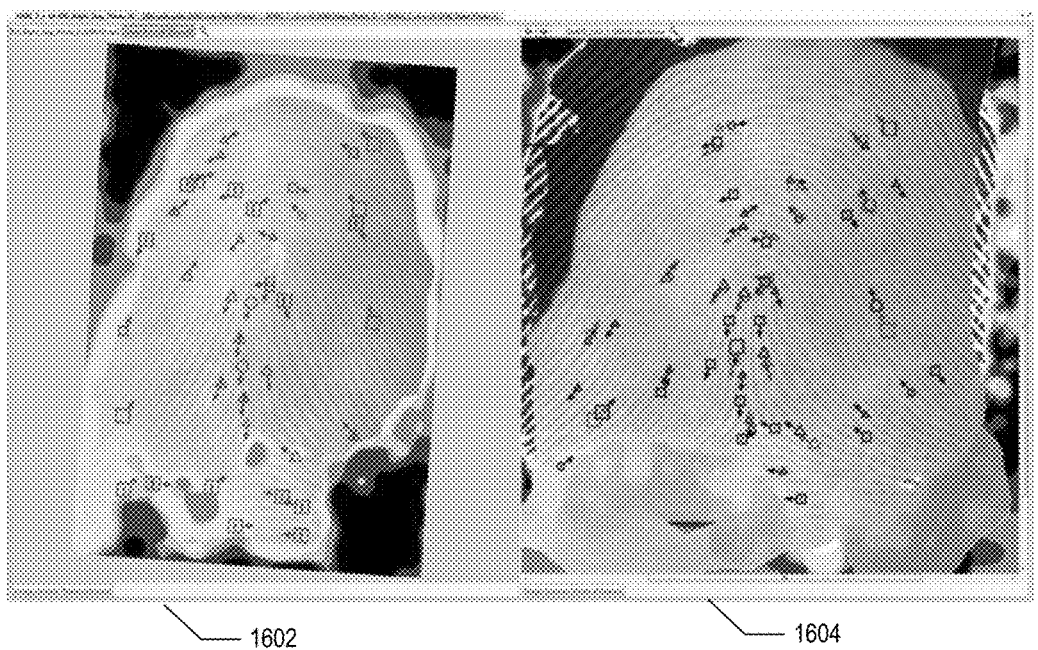
FIG. 16 shows a fingerprint image compared against a rolled (live scan) reference print for the same finger.

FIG. 16 shows a fingerprint image 1602 compared against a rolled (live scan) reference print 1604 for the same finger. The matching was performed using the Ridge-Specific Marker algorithm described above. Notable is the transformation of the 3 dimensional fingerprint to fit onto the 2 dimensional reference image. This transformation provides an excellent illustration of what physically happens when an image captured with a camera is mapped against a scanned image. To confirm the quality of the match, corresponding minutiae points are shown in both images.

Figure 17:
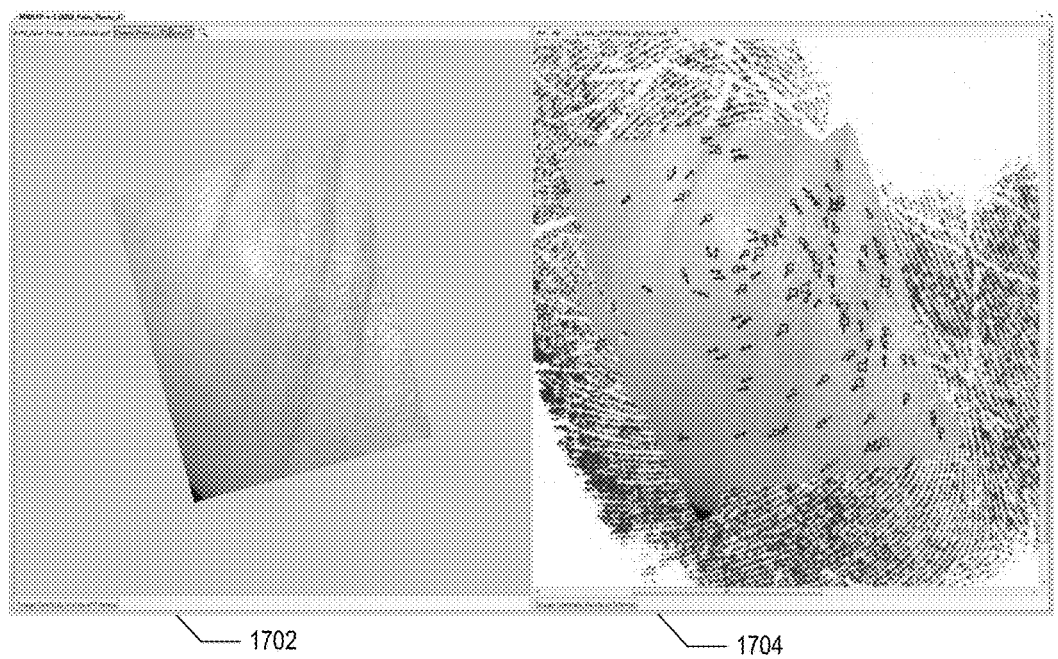
FIG. 17 shows the same process of FIG. 16 applied to a section of palmprint.

FIG. 17 shows the same process applied to a section of palmprint. The insert shows the relative size of the photographed palm 1702 to the reference palm 1704. Similar to fingerprints, minutiae points are shown on the palm image to indicate points of similarity with the photograph of the actual palm.

Because they can be found "everywhere", smartphones offer the potential for greatly expanding the ability of law enforcement and the military to obtain fingerprints when needed with no special equipment. The cameras typically used in smartphones offer excellent resolution and certainly have the power to produce high quality photographs. However, there are numerous unique technical issues that arise when capturing fingerprints through smartphones. The systems and methods described herein identify these issues and formulated working solutions. These solutions include software onboard the mobile device to control the focus of the camera and permit the capture of metadata. Also included is image processing functionality that can either be in the device or cloud based to render the photograph or image into a true fingerprint, capture minutiae and generate an AFIS query. Finally, MEBA offers "AFIS Afterburner" technology to resolve images of poorer quality, if necessary.

FIG. 18 shows a schematic of two potential operational scenarios for performing AFIS queries using, e.g., smartphone devices. In "Option 1", (1) the smartphone captures an image of the hand; (2) the image is checked on the device to ensure proper quality, positioning and focus; (3) the images is transferred via an Internet connection to a web-based (or cloud-based) processing service; (4) the processing service converts the photograph to a high contrast image and extracts the minutiae; (5) the minutiae and image are used to create a "search query" in the format required by the AFIS; (6) the processing service then submits the query to the AFIS; (7) the AFIS matches the query against a database of reference prints; (8) the AFIS transmits the results back to the processing service; (9) the processing service reviews the results and disambiguates results, if necessary; (10) the processing service transmits the results to the smartphone; and (11) the smartphone displays the results for the user.

In "Option 2", (1) the smartphone captures an image of the hand; (2) the image is checked on the device to ensure proper quality, positioning and focus; (3) the image is then processed on the device; (4) the device converts the photograph to a high contrast image and extracts the minutiae; (5) the minutiae and image are used to create a "search query" in the format required by the AFIS; (6) the device then submits the query to the AFIS; (7) the AFIS matches the query against a database of reference prints; (8) the AFIS transmits the results back to the device; (9) the device reviews the results and disambiguates results, if necessary; (10) device then displays the results for the user.

The distinction between the two options above is that in the first option, there is an intermediary web-based service that processes the image into a search query, while the second option contains this functionality on the actual smartphone device.

Figure 19:
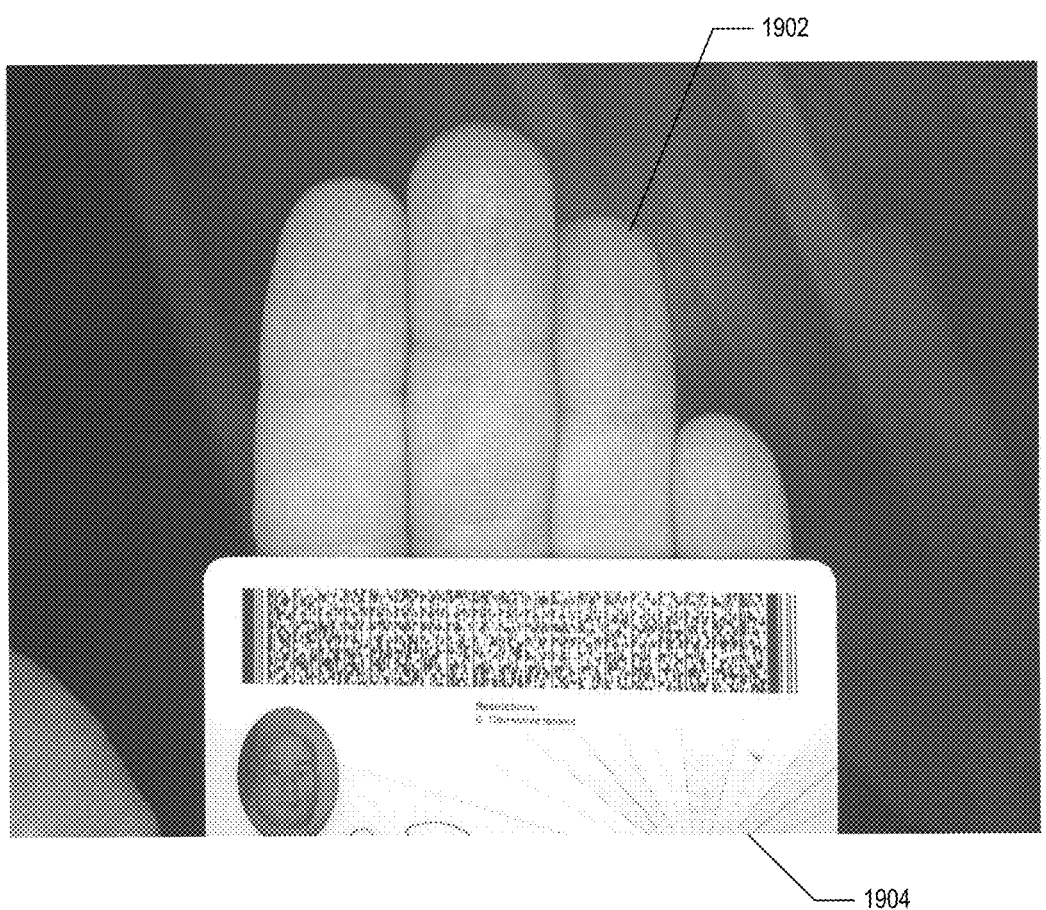
FIG. 19 shows a photograph of fingers and a driver's license in the same frame that can be automatically processed to extract the fingerprint information as well as the biographic information from the driver's license in accordance with one embodiment.

During the time the image is captured, the smartphone can also capture relevant metadata. The metadata can be captured through conventional data entry fields and can include: name, address, age, etc. Most state drivers' licenses have this biographic information either printed on the license or encoded as a barcode. During the time an image is captured, a driver's license can be concurrently photographed and the information either read from the license using optical character recognition or decoded from the barcode typically on the back of the license. FIG. 19 shows a photograph of fingers 1902 and a driver's license 1904 in the same frame. The image can be automatically processed to extract the fingerprint information as well as the biographic information from the driver's license. The metadata can ultimately be added to the fingerprint record generated by the transaction that follows the capturing of the image.

Figure 20:
FIG. 20 shows an example smartphone application in use.

FIG. 20 shows an example smartphone application in use. The simple user interface provides an outline of three fingers. The user places the index, middle and ring fingers within this template (outline) and snaps a photograph. From this information, the application determines the fingers orientation and generates an image that becomes the basis for an AFIS query.

Figure 21:
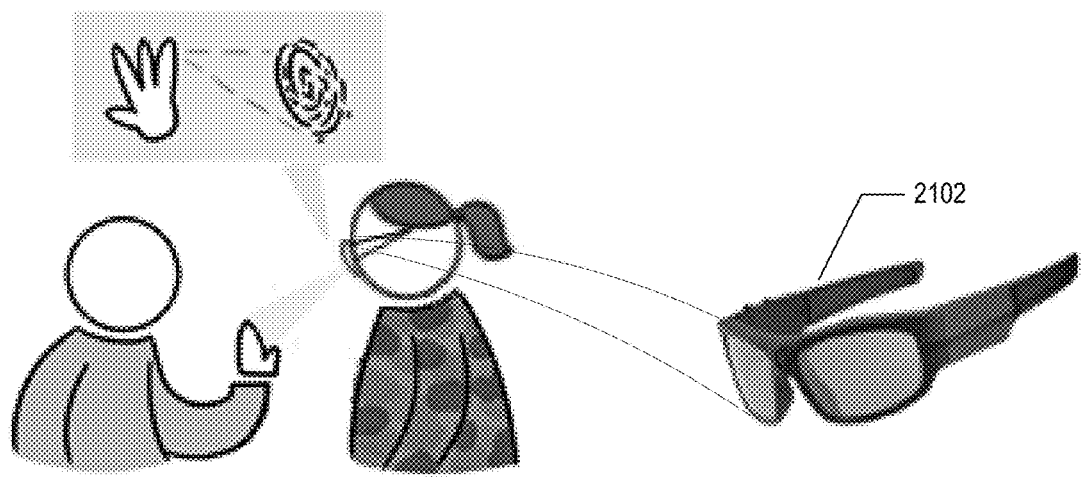
FIG. 21 shows a set of commercial glasses configured to implement the systems and methods described herein in accordance with one embodiment.

The invention herein discussed can be extendible into wearable devices such as body cameras and glasses. FIG. 21 shows a set of commercial glasses 2102 that contain display, camera, processing and connectivity functions similar to a smartphone. These devices can be fitted with the technology to function in the same way as a smartphone. The user can make menu selections from the display (in the lenses) through eye movement. Camera control can be accomplished in the same way. Images can be captured and processed and results presented on the display performing all activities in a hands free manner. An implementation of the present invention within a wearable appliance is shown in FIG. 13. For example, a police officer would ask a suspect to raise his/her hands while the lens display provided an area where the hands would be located, similar to the three finger target in the smartphone version. When the hands were properly placed to obtain an image of correct resolution, either the officer could trigger a photograph or the system could automatically capture the image.

Figure 22:
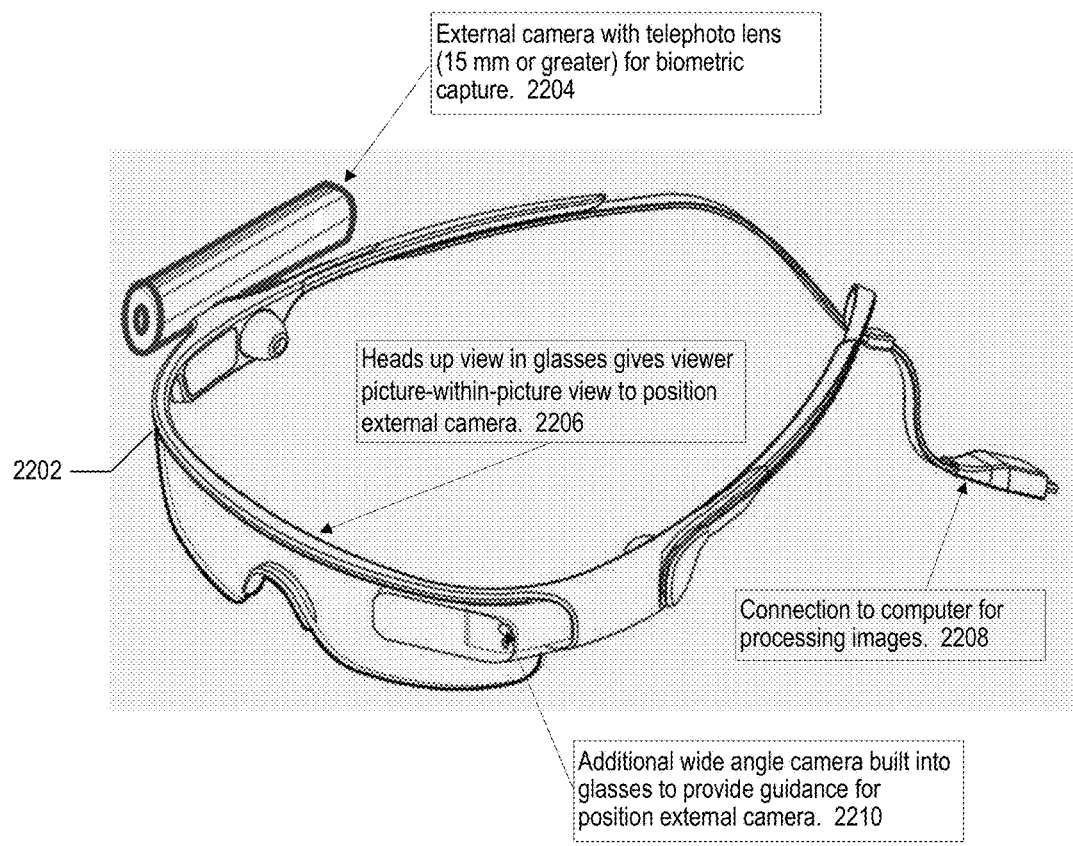
FIG. 22 shows a schematic of glasses configured to implement the systems and methods described herein in accordance with one embodiment.

FIG. 22 shows a schematic of glasses configured to perform the functionality described above. The device 2202 would consist of conventional "smart glasses" equipped with heads-up video display 2206 to present images to the wearer. The glasses are fitted with an outboard video camera 2204 (4 k video is ideal). The glasses also have a built in camera 2210 with a wide angle lens. The built in camera 2210 can be configured to capture the same field of view the wearer of the glasses sees. The video output from the onboard and outboard cameras is transmitted to a computer, which will locate the outboard camera image within the inboard camera image. This will permit the wearer of the glasses to see where the outboard camera is pointing.

The heads up display 2206 in the glasses has a view are with a target similar to the one used in the mobile application. The alignment between cameras will be such the target covers the area of view for the outboard camera. The user will use this target to approximate distance to the hands of persons from whom fingerprints are to be extracted. The user will position the hand of a person of interest in this target. Video of the target area will be captured and using methods herein discussed, focus on the fingers in the view area will be established. Focus and distance can be established by moving the lens on the outboard camera until proper focus is achieved. Also, triangulation between the two cameras will guide the user's movement to establish focus and distance as an alternative focusing method.

It will be apparent that other biometric measures can be used to generate forms of impression evidence both on the smartphone as well as "pads" and wearable appliances such as glasses. Other biometrics include: face, voice and handwriting. Other forms of impression evidence include latent fingerprints; toolmarks; shoe prints; and scars, marks and tattoos.

What is claimed:

1. A system for transforming an image of a fingerprint, comprising:
   a mobile device, comprising:
      a first communication interface,
      a camera configured to capture at least one image of at least one fingerprint, and
      a mobile device processor configured to execute instructions, the instructions configured to cause the mobile device processor to receive the image from the camera and transmit the image to an image processing system via the first communication interface; and
   an image processing system, comprising:
      a second communication interface configured to receive the image, and
      an image processor configured to execute instructions, the instructions configured to cause the image processor to receive the image from the second communication interface, and:
         render the image into a high contrast image,
         establish focus and image resolution for the image,
         perform noise reduction on the image, and
         perform distortion elimination on the image,
         wherein the instructions are configured to cause the mobile device processor to control the camera such that the image is captured at an initial focus distance, and then to convolve the captured image with Laplacian of Gaussian kernel to create a filtered image reflecting the amount to fine edge resolution, assign scores to the filtered image, and then cause the camera to update the focus distance until an optimal distance is determined.

2. The system of claim 1, wherein rendering the image into a high contrast image comprises applying adaptive histogram equalization to separate between ridges and valleys in the at least one fingerprint in the image.

3. The system of claim 1, wherein multiple images at multiple angles of the at least one fingerprint are obtained, and wherein the instructions are further configured to cause the image processor to fuse the multiple images and create a depth map of the at least one fingerprint.

4. The system of claim 1, wherein rendering the image into a high contrast image comprises:
   bandpass filtering the image;
   analyzing an orientation pattern associated with the fingerprint in the image;
   applying a segmentation mask to the image;
   smoothing an orientation field;
   enhancing ridges of the fingerprint in the image; and
   applying quadrature to the mage.

5. The system of claim 1, wherein the instructions are further configured to cause the image processor to transmit the image to an Automated Fingerprint Identification System via the second communication interface.

6. A system for transforming an image of a fingerprint, comprising:
   a mobile device, comprising:
      a first communication interface,
      a camera configured to capture at least one image of at least one fingerprint, and
      a mobile device processor configured to execute instructions, the instructions configured to cause the mobile device processor to receive the image from the camera and transmit the image to an image processing system via the first communication interface; and
   an image processing system, comprising:
      a second communication interface configured to receive the image, and an image processor configured to execute instructions, the instructions configured to cause the image processor to receive the image from the second communication interface, and:
render the image into a high contrast image,
establish focus and image resolution for the image,
perform noise reduction on the image, and
perform distortion elimination on the image,
wherein establishing image resolution comprises determining the resolution of the image using $(W*F_L)/(S_x*F_D)$ where W is the width of the camera image, $F_L$ is the focus length of the camera, $F_D$ is the focus distance and $S_x$ is the physical sensor size.

7. The system of claim 1, A system for transforming an image of a fingerprint, comprising:
a mobile device, comprising:
a first communication interface,
a camera configured to capture at least one image of at least one fingerprint, and
a mobile device processor configured to execute instructions, the instructions configured to cause the mobile device processor to receive the image from the camera and transmit the image to an image processing system via the first communication interface; and
an image processing system, comprising:
a second communication interface configured to receive the image, and
an image processor configured to execute instructions, the instructions configured to cause the image processor to receive the image from the second communication interface, and:
render the image into a high contrast image,
establish focus and image resolution for the image,
perform noise reduction on the image, and
perform distortion elimination on the image,
wherein noise reduction comprises:
copying a region of interest within the fingerprint in the image into a buffer;
applying a windowing function to the image;
applying a Fourier transform to the image to create an FFT image;
rotating each quadrant of the image to relocate a DC component and low frequency components from a corner to the image center;
set the value of each low frequency component whose orientation exceeds a threshold angle from a predicted orientation to zero;
rotate the quadrants back to their original positions using an inverse Fourier transform to create an inverse FFT image; and
replace the region of interest in the image with the weighted sum of the original image and the inverse FFT image.

* * * * *